United States Patent
Kawamura et al.

(10) Patent No.: US 10,851,465 B2
(45) Date of Patent: *Dec. 1, 2020

(54) ZINC-BASED PLATED STEEL SHEET

(71) Applicant: NIPPON STEEL & SUMITOMO METAL CORPORATION, Tokyo (JP)

(72) Inventors: Yasuaki Kawamura, Tokyo (JP); Koji Akioka, Tokyo (JP); Akihiro Sengoku, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 15/555,665

(22) PCT Filed: Mar. 31, 2016

(86) PCT No.: PCT/JP2016/060814
§ 371 (c)(1),
(2) Date: Sep. 5, 2017

(87) PCT Pub. No.: WO2016/159306
PCT Pub. Date: Oct. 6, 2016

(65) Prior Publication Data
US 2018/0044809 A1    Feb. 15, 2018

(30) Foreign Application Priority Data

Mar. 31, 2015 (JP) ................................. 2015-073557

(51) Int. Cl.
| | |
|---|---|
| B32B 15/04 | (2006.01) |
| C25D 5/48 | (2006.01) |
| C09D 7/40 | (2018.01) |
| C23C 28/00 | (2006.01) |
| C09D 1/00 | (2006.01) |
| C23C 2/26 | (2006.01) |
| B21D 22/02 | (2006.01) |
| C23C 2/06 | (2006.01) |
| C25D 3/22 | (2006.01) |
| C25D 3/56 | (2006.01) |
| C21D 1/673 | (2006.01) |
| C08K 3/20 | (2006.01) |

(52) U.S. Cl.
CPC ............. *C25D 5/48* (2013.01); *B21D 22/022* (2013.01); *C09D 1/00* (2013.01); *C09D 7/67* (2018.01); *C23C 2/06* (2013.01); *C23C 2/26* (2013.01); *C23C 28/00* (2013.01); *C25D 3/22* (2013.01); *C25D 3/565* (2013.01); *C08K 3/20* (2013.01); *C21D 1/673* (2013.01); *Y10T 428/12611* (2015.01)

(58) Field of Classification Search
None
See application file for complete search history.

(56) References Cited

U.S. PATENT DOCUMENTS

| | | | | |
|---|---|---|---|---|
| 6,040,054 | A * | 3/2000 | Odashima | B05D 7/51 106/14.05 |
| 10,549,506 | B2 * | 2/2020 | Kawamura | C22C 38/22 |
| 2002/0098345 | A1 * | 7/2002 | Kamo | C09D 5/084 428/336 |
| 2004/0062873 | A1 * | 4/2004 | Jung | C09D 7/67 427/407.1 |
| 2004/0244648 | A1 | 12/2004 | Akui et al. | |
| 2005/0022908 | A1 | 2/2005 | Tounaka et al. | |
| 2012/0118437 | A1 * | 5/2012 | Wang | B21D 22/022 148/512 |
| 2014/0048181 | A1 | 2/2014 | Banik et al. | |

FOREIGN PATENT DOCUMENTS

| | | |
|---|---|---|
| CN | 1282719 C | 11/2006 |
| JP | 3-274285 A | 12/1991 |
| JP | 7-18400 A | 1/1995 |
| JP | 2002-88485 A | 3/2002 |
| JP | 2003-73774 A | 3/2003 |
| JP | 2003-126921 A | 5/2003 |
| JP | 2003-129209 A | 5/2003 |
| JP | 2004-270029 A | 9/2004 |
| JP | 2004-323897 A | 11/2004 |

(Continued)

OTHER PUBLICATIONS

Office Action dated Jul. 31, 2018, in Japanese Patent Application No. 2017-510225, with partial English translation.
Extended European Search Report for European Application No. 16773186.8, dated Oct. 8, 2018.
Office Action dated Jan. 2, 2019, in Korean Patent Application No. 10-2017-7026349, with partial English translation.
Office Action dated Feb. 26, 2019, in Japanese Patent Application No. 2017-510225, with English translation.
Office Action dated Mar. 13, 2019, in Korean Patent Application No. 10-2017-7026349, with partial English translation.
International Search Report for PCT/JP2016/060814 dated Jul. 5, 2016.
Office Action for TW 105110547 dated Mar. 17, 2017.
Written Opinion of the International Searching Authority for PCT/JP2016/060814 (PCT/ISA/237) dated Jul. 5, 2016.
Office Action dated Nov. 19, 2018, in Chinese Patent Application No. 201680017614.8, with partial English translation.

(Continued)

*Primary Examiner* — Seth Dumbris
(74) *Attorney, Agent, or Firm* — Birch, Stewart, Kolasch & Birch, LLP

(57) ABSTRACT

[Object] To provide a zinc-based plated steel sheet excellent in coating film adhesiveness after hot pressing more conveniently.
[Solution] A zinc-based plated steel sheet according to the present invention comprises: a zinc-based plated steel sheet that is a base metal; and a surface treatment layer formed on at least one surface of the zinc-based plated steel sheet, in which the surface treatment layer contains one or more oxides selected from titanium oxide, nickel oxide, and tin(IV) oxide each having a particle size of more than or equal to 2 nm and less than or equal to 500 nm, in a range of more than or equal to 0.2 g/m² and less than or equal to 2 g/m² per one surface.

6 Claims, No Drawings

(56) References Cited

FOREIGN PATENT DOCUMENTS

| JP | 2007-63578 A | 3/2007 |
| JP | 2007-291508 A | 11/2007 |
| JP | 2010-248582 A | 11/2010 |
| JP | 2011-74409 A | 4/2011 |
| JP | 2011-104988 A | 6/2011 |
| WO | WO 03/037996 A1 | 5/2003 |

OTHER PUBLICATIONS

Chinese Office Action dated Apr. 28, 2019, for corresponding Chinese Application No. 201680017614.8, with partial English translation.

Indian Office Action dated Apr. 16, 2019, for corresponding Indian Application No. 201717030875, with English translation.

Indonesian Office Action dated Jul. 11, 2019, for corresponding Indonesian Application No. P00201706479, with partial English translation.

Japanese Office Action dated Aug. 6, 2019, for corresponding Japanese Application No. 2017-510225, with partial English translation.

Brazilian Office Action and Search Report dated Jan. 27, 2020 for corresponding Brazilian Application No. 112017019317-5, with partial translation.

European Office Action dated Jan. 28, 2020 for corresponding European Application No. 16773186.8.

* cited by examiner

ZINC-BASED PLATED STEEL SHEET

TECHNICAL FIELD

The present invention relates to a zinc-based plated steel sheet.

BACKGROUND ART

These days, to protect the environment and prevent global warming, the suppression of the consumption of fossil fuel is increasingly demanded, and the demand influences various manufacturing industries. For example, automobiles, which are indispensable to daily life and activity as a moving means, are no exception, and improvements in fuel efficiency etc. by the weight reduction of car bodies etc. are required. However, for automobiles, simply achieving a weight reduction of the car body is not permitted in terms of the functionality of the product, and it is necessary to ensure proper safety.

Most of the structure of the automobile is formed of iron-based materials, in particular steel sheets, and the reduction in the weight of the steel sheet is important to the weight reduction of the car body. However, as described above, simply reducing the weight of the steel sheet is not permitted, and ensuring the mechanical strength of the steel sheet is required at the same time. Such a demand on the steel sheet is placed not only in the automobile manufacturing industry but also in various manufacturing industries similarly. Hence, research and development are being made to enhance the mechanical strength of the steel sheet and thereby obtain a steel sheet in which the mechanical strength can be maintained or improved even when the wall thickness is made smaller than those of conventionally used steel sheets.

In general, a material having high mechanical strength tends to decrease in shape fixability in molding such as bending, and is difficult to mold into a complicated shape. As a means for solving such a problem with moldability, what is called "the hot pressing method (also called the hot stamping method or the die quenching method)" is given. In the hot pressing method, a material to be molded is once heated to high temperature, the steel sheet softened by heating is pressed to be molded, and then cooling is performed. By the hot pressing method, the material of the object can be easily pressed because the material is once heated to high temperature and softened. Furthermore, the mechanical strength of the material can be enhanced by the quenching effect by the cooling after molding. Thus, a molded product in which both good shape fixability and high mechanical strength are achieved can be obtained by the hot pressing method.

However, when the hot pressing method is used for a steel sheet, the surface of the steel sheet is oxidized by the steel sheet being heated to a high temperature of 800° C. or more, and scales (compounds) are produced. Hence, the process of removing the scales (what is called a descaling process) is needed after hot pressing is performed, and productivity is reduced. In addition, in a member etc. requiring corrosion resistance, it is necessary to perform anti-rust treatment or metal covering on the surface of the member after processing, and a surface cleaning process and a surface treatment process are needed; consequently, productivity is further reduced.

As a method to suppress such a reduction in productivity, for example, a method in which a steel sheet to be hot pressed is provided with a covering in advance is given. Various materials such as organic-based materials and inorganic-based materials are generally used as the covering on the steel sheet. Among these, plated steel sheets based on zinc (Zn), which has a sacrificial anti-corrosion action on the steel sheet, are widely used as automotive steel sheets etc. from the viewpoints of the anti-corrosion capacity and the steel sheet production technique.

By providing a Zn-based metal covering, the production of scales on the surface of the steel sheet can be prevented, and processes such as descaling become unnecessary; thus, the productivity of molded products is improved. In addition, the Zn-based metal covering has also an anti-rust effect, and therefore also corrosion resistance is improved. Patent Literature 1 to Patent Literature 4 below disclose a method of hot pressing a plated steel sheet that is obtained by providing a Zn-based metal covering to a steel sheet having a prescribed component composition.

In Patent Literature 1 to Patent Literature 3 below, a hot-dip galvanized steel sheet or an alloyed hot-dip galvanized steel sheet is used as a steel sheet for hot pressing. By using a hot-dip galvanized steel sheet or an alloyed hot-dip galvanized steel sheet for hot pressing, a structure member can be molded without iron oxides (that is, scales) being formed on the surface. Further, in view of the fact that, when a Zn oxide layer is formed thick on the surface of a heat-treated steel material obtained by hot pressing a Zn-based plated steel sheet, the coating film adhesiveness and the post-coating corrosion resistance of the heat-treated steel material are adversely affected, Patent Literature 4 below discloses an invention in which a heat-treated steel material is subjected to shot blasting to remove a Zn oxide layer or is subjected to coating after the thickness of a Zn oxide layer is reduced.

Patent Literature 5 and Patent Literature 6 below disclose inventions that improve the coating film adhesiveness and the post-coating corrosion resistance of a heat-treated steel material obtained by hot pressing a Zn-based plated steel sheet. Patent Literature 5 below discloses an invention in which a hot-dip galvanized steel sheet with its surface covered with a silicone resin coating film is used as a steel sheet for hot pressing, and Patent Literature 6 below discloses an invention in which a hot-dip galvanized steel sheet covered with a barrier layer containing phosphorus (P) and silicon (Si) (a phosphate is given as an example of P, and colloidal silica is given as an example of Si) is used as a steel sheet for hot pressing.

Patent Literature 7 below discloses a technology in which elements that are easier to oxidize than Zn (easily oxidizable elements) are added into a galvanized layer and an oxide layer of these easily oxidizable elements is formed on the outer layer of the galvanized layer during the temperature increase in hot pressing, and thereby the volatilization of Zn is prevented.

According to the inventions disclosed by Patent Literature 5 to Patent Literature 7 below, since a galvanized layer is covered with the barrier layer described above, the vaporization of Zn is suppressed, and thus the adhesiveness of an intermediate coating film and an over-coating film and post-coating corrosion resistance are good.

CITATION LIST

Patent Literature

Patent Literature 1: JP 2003-73774A
Patent Literature 2: JP 2003-129209A
Patent Literature 3: JP 2003-126921A Patent Literature 4: JP 2004-323897A
Patent Literature 5: JP 2007-63578A
Patent Literature 6: JP 2007-291508A
Patent Literature 7: JP 2004-270029A

SUMMARY OF INVENTION

Technical Problem

However, there may be a case where satisfactory post-coating adhesiveness is not obtained in the following cases: the Zn-based plated steel sheet is hot pressed; and the attached amount of a phosphate coating film formed through phosphate treatment and a treatment coating film (FF treatment coating film) obtained by using an aqueous solution containing Zr ions and/or Ti ions and fluorine, and containing 100 to 1000 ppm of free fluoride ions (hereinafter, referred to as FF chemical conversion treatment liquid).

In general, in the case where chemical conversion treatability is not sufficient (for example, in the case where attachment unevenness, lack of hiding, and the like occur), the adhesiveness between the steel sheet and an electrodeposition coating film is not sufficiently secured, and as a result, post-coating adhesiveness becomes poor. Reasons why the chemical conversion treatability becomes insufficient include that degreasing and surface conditioning before the chemical conversion treatment are insufficient, and that the concentration and the temperature of the chemical conversion treatment liquid and the time of the chemical conversion treatment are insufficient.

As another reason, there is given that the chemical convertibility is reduced due to Al contained in hot-dip galvanizing. Specifically, the Al in the hot-dip galvanizing layer diffuses and moves to the outer layer of the plating layer not only during the formation of a plating coating film but also during the heating of hot pressing, and forms an Al oxide film. Since the Al oxide film does not dissolve in phosphoric acid, the reaction between Zn and a phosphate (for example, zinc phosphate) is inhibited, and a phosphate coating film is less likely to be formed in the area where the Al oxide film is formed. Consequently, phosphate treatability is low in the area where the Al oxide film is formed. In particular, phosphate treatability is significantly reduced in the case where, in the hot pressing process, the steel sheet is rapidly heated to the $Ac_3$ point or more by energization heating or induction heating and then press molding is quickly performed, and as a result, coating adhesiveness is also reduced.

In addition, when the present inventors conducted a check experiment on a heat-treated steel material disclosed by Patent Literature 5 above that was obtained by using, as a steel sheet for hot pressing, a hot-dip galvanized steel sheet with its surface covered with a silicone resin coating film, it has been found that, as will be described later, although post-coating corrosion resistance in a cycle corrosion test in which a dry and a wet environment are repeated is good, coating adhesiveness is not always good. Hence, a heat-treated steel material obtained by the invention disclosed in Patent Literature 5 above is not suitable for use as it is for a part or a member in which water is likely to collect because of the structure (for example, a bag-like structural part below the door, a member with a closed cross section in the engine compartment, etc.), for example.

On the other hand, the addition of easily oxidizable elements into a zinc plating layer disclosed in Patent Literature 7 above requires new operational actions, such as the temperature control of the plating bath and dross measures.

Thus, the present invention has been made in view of the issue mentioned above, and an object of the present invention is to provide a zinc-based plated steel sheet excellent in coating film adhesiveness after hot pressing more conveniently.

Solution to Problem

On the basis of the findings obtained by extensive studies on the plated steel sheet for hot pressing of the object mentioned above, the present inventors have thought up the following zinc-based plated steel sheet.

The gist of the present invention is as follows.

(1)

A zinc-based plated steel sheet comprising:

a zinc-based plated steel sheet that is a base metal; and a surface treatment layer formed on at least one surface of the zinc-based plated steel sheet, in which the surface treatment layer contains one or more oxides selected from titanium oxide, nickel oxide, and tin(IV) oxide each having a particle size of more than or equal to 2 nm and less than or equal to 100 nm, in a range of more than or equal to 0.2 $g/m^2$ and less than or equal to 2 $g/m^2$ per one surface.

(2)

The zinc-based plated steel sheet according to (1), in which the surface treatment layer further contains at least one of one or more phosphorus-containing compounds, one or more vanadium-containing compounds, one or more copper-containing compounds, one or more aluminum-containing compounds, one or more silicon-containing compounds, or one or more chromium-containing compounds in the following range as a content per one surface, the one or more phosphorus-containing compounds: more than or equal to 0.0 $g/m^2$ and less than or equal to 0.01 $g/m^2$ on a P basis, the one or more vanadium-containing compounds: more than or equal to 0.0 $g/m^2$ and less than or equal to 0.01 $g/m^2$ on a V basis, the one or more copper-containing compounds: more than or equal to 0.0 $g/m^2$ and less than or equal to 0.02 $g/m^2$ on a Cu basis, the one or more aluminum-containing compounds: more than or equal to 0.0 $g/m^2$ and less than or equal to 0.005 $g/m^2$ on an Al basis, the one or more silicon-containing compounds: more than or equal to 0.0 $g/m^2$ and less than or equal to 0.005 $g/m^2$ on a Si basis, and the one or more chromium-containing compounds: more than or equal to 0.0 $g/m^2$ and less than or equal to 0.01 $g/m^2$ on a Cr basis.

(3)

The zinc-based plated steel sheet according to (1) or (2), in which the particle size of each of the one or more oxides selected from titanium oxide, nickel oxide, and tin(IV) oxide is more than or equal to 5 nm and less than or equal to 50 nm.

(4)

The zinc-based plated steel sheet according to any one of (1) to (3), in which the content of the one or more oxides selected from titanium oxide, nickel oxide, and tin(IV) oxide is more than or equal to 0.4 $g/m^2$ and less than or equal to 1.5 $g/m^2$ per one surface.

(5)

The zinc-based plated steel sheet according to any one of (1) to (4), in which the one or more oxides are titanium oxide.

(6)

The zinc-based plated steel sheet according to any one of (1) to (5), in which the zinc-based plated steel sheet is a zinc-based plated steel sheet for hot pressing.

Advantageous Effects of Invention

As described above, according to the present invention, even though the chemical conversion treatment is insufficient, it becomes possible to improve the coating adhesiveness to a coating film provided after hot pressing.

DESCRIPTION OF EMBODIMENTS

Hereinafter, preferred embodiments of the present invention are described in detail.

<1. Zinc-Based Plated Steel Sheet>

A Zn-based plated steel sheet according to an embodiment of the present invention includes a Zn-based plating layer on a ground steel sheet, and further includes a surface treatment layer described in detail below on at least one surface of the hot-dip Zn-based plating layer. The surface treatment layer includes a coating layer containing one or more oxides selected from titanium oxide, nickel oxide, and tin(IV) oxide each having a particle size of more than or equal to 2 nm and less than or equal to 100 nm, in the range of more than or equal to 0.2 g/m$^2$ and less than or equal to 2 g/m$^2$ per one surface as an attached amount. The Zn-based plated steel sheet having such a configuration can be suitably used for the hot pressing method described above. Hereinafter, the configuration of the Zn-based plated steel sheet will be described in detail.

(1) Ground Steel Sheet

The ground steel sheet used for the Zn-based plated steel sheet according to the present embodiment is not particularly limited, and various steel sheets having known characteristics and chemical compositions may be used. The chemical composition of the steel sheet is not particularly limited, but is preferably a chemical composition with which high strength is obtained by quenching. For example, when it is attempted to obtain a heat-treated steel material with a tensile strength of 980 MPa or more, an example of the ground steel sheet is made of steel for quenching having a chemical composition of, in mass %, C: 0.05 to 0.4%, Si: less than or equal to 0.5%, Mn: 0.5 to 2.5%, P: less than or equal to 0.03%, S: less than or equal to 0.01%, sol. Al: less than or equal to 0.1%, N: less than or equal to 0.01%, B: 0 to 0.005%, Ti: 0 to 0.1%, Cr: 0 to 0.5%, Nb: 0 to 0.1%, Ni: 0 to 1.0%, Mo: 0 to 0.5%, and the balance: Fe and impurities.

When it is attempted to obtain a heat-treated steel material with a relatively low strength in which the strength becomes less than 980 MPa during quenching, the chemical composition of the ground steel sheet is not necessarily be in the range described above.

The total amount of Mn and Cr contained is preferably 0.5 to 3.0% from the viewpoint of quenchability during the quenching described above and the viewpoint of forming Mn oxides and Cr oxides contained in a zinc oxide layer after heating. The total amount of Mn and Cr contained is more preferably 0.7 to 2.5%.

When Mn and Cr are contained as the chemical composition of the steel sheet, part of the zinc oxide layer formed on the outer layer after hot pressing becomes composite oxides containing Mn and Cr. Coating adhesiveness after phosphate-based chemical conversion treatment is further improved by these composite oxides containing Mn and Cr being formed. Although details are unknown, it is presumed that, by these composite oxides being formed, the alkali resistance of the phosphate-based chemical conversion treatment coating film formed is improved as compared to zinc oxide, and good coating adhesiveness is exhibited.

In the case where Mn and Cr are contained as the chemical composition of the steel sheet, the content of Mn and Cr is preferably in the range of, in mass %, more than or equal to 0.5% and less than or equal to 3.0%, and more preferably in the range of, in mass %, more than or equal to 0.7% and less than or equal to 2.5%. In the case where the content of Mn+Cr is less than 0.5%, zinc oxide that is formed on the outer layer after hot pressing and composite oxides that contain Mn and Cr are insufficient, and it may be difficult to bring out more satisfactory coating adhesiveness. On the other hand, in the case where the content of Mn+Cr exceeds 3.0%, although there is no problem with coating adhesiveness, the cost is increased, and furthermore the toughness of the spot welded portion may be significantly reduced and the wettability of plating may be significantly degraded.

(2) Zn-Based Plating Layer

The Zn-based plating layer according to the present embodiment is not particularly limited, and commonly known zinc-based plating may be used. Specifically, examples of the Zn-based plating layer according to the present embodiment include hot-dip galvanizing, alloyed hot-dip galvanizing, hot-dip Zn-55% Al-1.6% Si plating, hot-dip Zn-11% Al plating, hot-dip Zn-11% Al-3% Mg plating, hot-dip Zn-6% Al-3% Mg plating, hot-dip Zn-11% Al-3% Mg-0.2% Si plating, Zn electroplating, Zn—Ni electroplating, and Zn—Co electroplating. It is also effective to form a covering of plating of the components mentioned above by a method such as vapor deposition; thus, the method of plating is not particularly limited.

In the present embodiment, as a specific hot-dip plating operation, an operation in which a steel sheet is dipped in a plating bath in which Zn or a Zn alloy in a molten state is retained and the steel sheet is pulled up from the plating bath is performed. The amount of plating attached to the steel sheet is controlled by adjusting the speed of the pulling-up of the steel sheet, the flow rate and the flow velocity of wiping gas jetted from a wiping nozzle provided above the plating bath, etc. Alloying treatment is performed by, after plating treatment like the above, additionally heating the plated steel sheet using a gas furnace or an induction heating furnace, a heating furnace in which these are combined, or the like. The plating operation may also be performed by the method of continuously plating a coil or the method of plating a cut sheet single body.

In the present embodiment, as a specific plating operation in the case of using electroplating, electrolysis treatment is performed in an electrolyte solution containing Zn ions, using the steel sheet, as a negative electrode, and a counter electrode. The amount of plating attached to the steel sheet is controlled by the composition of the electrolyte solution, the current density, and the electrolysis time.

The thickness of the Zn-based plating layer (that is, the amount of the Zn-based plating layer attached) is preferably in the range of 20 g/m$^2$ to 100 g/m$^2$ per one surface. In the case where the thickness of the Zn-based plating layer is less than 20 g/m² per one surface, the effective amount of Zn after hot pressing cannot be ensured and corrosion resistance is insufficient; thus, this is not preferable. In the case where the thickness of the Zn-based plating layer is more than 100 g/m² per one surface, the processability and the adhesiveness of the Zn-based plating layer are reduced; thus, this is not preferable. A more preferred thickness of the Zn-based plating layer is in the range of 30 g/m² to 90 g/m² per one surface.

(3) Surface Treatment Layer

On the Zn-based plating layer, there is further formed a surface treatment layer containing one or more oxides selected from titanium oxide, nickel oxide, and tin(IV) oxide.

Here, the "one or more oxides selected from titanium oxide, nickel oxide, and tin(IV) oxide" represents, taking titanium oxide as an example, a substance that contains oxide of titanium (Ti) as a main component, which exists in a state of being dispersed in a treatment liquid as a solid having a size of several nanometers or more as a primary particle size, and does not exist in a state of being dissolved in the treatment liquid like titanium chelate. Also in the same manner, nickel oxide and tin(IV) oxide represent a substance that contains oxide of nickel (Ni) as a main component and a substance that contains oxide of tin (Sn) as a main component, respectively, which each exist in a state of being dispersed in a treatment liquid as a solid having a size of several nanometers or more as a primary particle size, and do not exist in a state of being dissolved in the treatment liquid. Using the one or more oxides selected from titanium oxide, nickel oxide, and tin(IV) oxide being dispersed in a treatment liquid as a solid, it becomes possible to provide a heat-treated steel material excellent in durability even in an environment of dipping in salt water. Note that the one or more oxides selected from titanium oxide, nickel oxide, and tin(IV) oxide exist in a state of particles in the surface treatment layer.

To be specific, the one or more oxides selected from titanium oxide, nickel oxide, and tin(IV) oxide each have a particle size (primary particle size) of more than or equal to 2 nm and less than or equal to 100 nm. For the particle size of the one or more oxides selected from titanium oxide, nickel oxide, and tin(IV) oxide, a smaller size is advantageous in terms of post-coating corrosion resistance, but those with a particle size of less than 2 nm are difficult to obtain and are disadvantageous in terms of cost. Further, in the case where the particle size of the one or more oxides selected from titanium oxide, nickel oxide, and tin(IV) oxide exceeds 100 nm, an influence given to the steel sheet by the titanium oxide particle decreases during heating in hot pressing (because a contact area with the plated steel sheet is small); thus, this is not preferable.

In addition, among these oxides, titanium oxide not only has the feature mentioned above but also can suppress excessive oxidation and vaporization of Zn during hot pressing, and can enhance not only coating film adhesiveness after hot pressing but also corrosion resistance after hot pressing. It is surmised that titanium oxide usually exists in a state of a metal oxide stably, but reacts with zinc oxide formed during heating in hot pressing and forms a composite oxide with zinc oxide, and thereby suppresses excessive oxidation and vaporization of Zn. To obtain this effect more efficiently, the particle size of titanium oxide mentioned above is preferably more than or equal to 2 nm and less than or equal to 100 nm.

The particle size of the one or more oxides selected from titanium oxide, nickel oxide, and tin(IV) oxide is preferably more than or equal to 5 nm and less than or equal to 50 nm.

The particle size (primary particle size) of the one or more oxides selected from titanium oxide, nickel oxide, and tin(IV) oxide can be measured by a known method; for example, the measurement can be made by a method in which a cross section-embedded sample is prepared after coating, several particle sizes of the one or more oxides selected from titanium oxide, nickel oxide, and tin(IV) oxide in the coating film are measured, and the average of the obtained measurement results is taken as the particle size.

The surface treatment layer included in the Zn-based plated steel sheet according to the present embodiment contains the one or more oxides selected from titanium oxide, nickel oxide, and tin(IV) oxide in the range of more than or equal to 0.2 g/m² and less than or equal to 2 g/m² per one surface. When the content of the one or more oxides selected from titanium oxide, nickel oxide, and tin(IV) oxide in the surface treatment layer is in the range of more than or equal to 0.2 g/m² and less than or equal to 2 g/m² per one surface, satisfactory adhesiveness between the surface of the steel sheet and an electrodeposition coating film is exhibited even in the case where the attached amount of various types of chemical conversion treatment (for example, phosphate treatment or FF chemical conversion treatment) performed on the Zn-based plated steel sheet is not sufficient. Although a detailed mechanism is not clear, the one or more oxides selected from titanium oxide, nickel oxide, and tin(IV) oxide are present on the surface of the steel sheet after heat treatment; thereby, some influence is given to the cohesion deposition of the electrodeposition coating film during electrodeposition coating, and the oxides and the electrodeposition coating film adhere strongly; thus, it is presumed that strong adhesiveness can be exhibited even when chemical conversion treatment (phosphate treatment or FF chemical conversion treatment) is not sufficient.

In the case where the content of the one or more oxides selected from titanium oxide, nickel oxide, and tin(IV) oxide in the surface treatment layer is less than 0.2 g/m² per one surface, the one or more oxides selected from titanium oxide, nickel oxide, and tin(IV) oxide after hot pressing are not sufficiently present, and hence, coating adhesiveness after hot pressing cannot be ensured sufficiently. On the other hand, in the case where the content of the one or more oxides selected from titanium oxide, nickel oxide, and tin(IV) oxide in the surface treatment layer exceeds 2 g/m² per one surface, the cost of the Zn-based plated steel sheet according to the present embodiment is increased, and it is presumed that the cohesive force of the surface treatment layer is weakened and a coating film that is formed on the surface treatment layer after hot pressing is likely to peel off.

In addition, in the case where the content of the titanium oxide is less than 0.2 g/m² per one surface, a sufficient amount of a composite oxide with zinc oxide cannot be formed, and the oxidation and vaporization of Zn cannot be efficiently suppressed.

The content of the one or more oxides selected from titanium oxide, nickel oxide, and tin(IV) oxide in the surface treatment layer is preferably more than or equal to 0.4 g/m² and less than or equal to 1.5 g/m² per one surface.

Specific examples of the one or more oxides selected from titanium oxide, nickel oxide, and tin(IV) oxide are shown below.

Specific example of commercially available products of titania sol includes TKS (registered trademark) series manufactured by Tayca Corporation.

Example of nickel oxide includes nickel oxide particles of commercially available (nano)powder.

Typical example of tin(IV) oxide sol that is a treatment liquid containing tin(IV) oxide, and specific example of commercially available products includes Ceramace manufactured by Taki Chemical Co., Ltd.

In forming the surface treatment layer, the treatment liquid or the like in which the one or more oxides selected from titanium oxide, nickel oxide, and tin(IV) oxide are dispersed may be applied as it is to the Zn-based plated steel sheet, however, in order to improve stability of the treatment liquid and adhesiveness of the surface treatment layer, it is more preferred that the treatment liquid have a resin or a crosslinking agent mixed therein, and the treatment liquid be applied to the Zn-based plated steel sheet.

In the case where the above sol in which the one or more oxides selected from titanium oxide, nickel oxide, and tin(IV) oxide are dispersed is used, a water-soluble or water-dispersible resin is preferably used as the resin. Examples of the resin include a polyurethane resin, a polyester resin, an epoxy resin, a (meth)acrylic resin, a polyolefin resin, a phenol resin, and modified products of those resins. In the case where zirconia powder is used, a solvent resin in which any of various solvents is used as the solvent may be used in addition to the above-mentioned water-based resin.

Examples of the crosslinking agent include a zirconium carbonate compound, an organic titanium compound, an oxazoline polymer, a water-soluble epoxy compound, a water-soluble melamine resin, a water-dispersible blocked isocyanate, and a water-based aziridine compound.

Further, examples of the other component that is preferably further contained in the surface treatment layer according to the present embodiment include one or more selected from zirconia, lanthanum oxide, cerium oxide, and neodymium oxide.

When zirconia, lanthanum oxide, cerium oxide, or neodymium oxide mentioned above is contained in the surface treatment layer, during heating, zirconia, lanthanum oxide, cerium oxide, or neodymium oxide in the surface treatment layer makes harmless an Al oxide that is present before hot pressing and is formed during hot pressing. Thereby, the formation of zinc oxide during hot pressing is accelerated; thus, phosphate treatability after hot pressing is enhanced, and coating film adhesiveness is improved. Although details of the fact that an Al oxide is made harmless during heating by zirconia, lanthanum oxide, cerium oxide, or neodymium oxide are unknown, it is presumed that zirconia, lanthanum oxide, cerium oxide, or neodymium oxide dissolves an Al oxide formed on the surface of the steel sheet, thereby Zn, which is relatively easy to oxide after Al, is oxidized during hot pressing, and consequently the production of zinc oxide (ZnO), which is excellent in chemical convertibility, is accelerated. To obtain this effect more efficiently, the particle size of the oxide mentioned above is preferably more than or equal to 5 nm and less than or equal to 500 nm.

The amount of the one or more selected from zirconia, lanthanum oxide, cerium oxide, and neodymium oxide contained in the surface treatment layer is preferably in the range of more than or equal to 0.2 $g/m^2$ and less than or equal to 2 $g/m^2$ per one surface. When the amount of the one or more selected from zirconia, lanthanum oxide, cerium oxide, and neodymium oxide contained in the surface treatment layer is less than 0.2 $g/m^2$ per one surface, sufficient zirconia, lanthanum oxide, cerium oxide, and neodymium oxide are not present after hot pressing; consequently, the effect of making harmless an Al oxide of the plated surface is reduced, and it may be difficult to sufficiently ensure coating adhesiveness after hot pressing. On the other hand, when the amount of zirconia etc. contained in the surface treatment layer is more than 2 $g/m^2$ per one surface, the cost of the Zn-based plated steel sheet according to the present embodiment is increased, and it is presumed that the cohesive force of the surface treatment layer is weakened and a coating film that is formed on the surface treatment layer after hot pressing is likely to peel off.

The content of the one or more selected from zirconia, lanthanum oxide, cerium oxide, and neodymium oxide in the surface treatment layer is preferably more than or equal to 0.4 $g/m^2$ and less than or equal to 1.5 $g/m^2$ per one surface.

Typical examples of the treatment liquid containing zirconia, lanthanum oxide, cerium oxide, and neodymium oxide include a zirconia sol, a lanthanum oxide sol, a cerium oxide sol, and a neodymium oxide sol, and specific examples of the commercially available product include NanoUse (registered trademark) series manufactured by Nissan Chemical Industries, Ltd. and Ceramase series manufactured by Taki Chemical Co., Ltd.

Further, examples of the other component that is preferably further contained in the surface treatment layer according to the present embodiment include magnesium oxide, calcium oxide, or zinc oxide.

When the surface treatment layer contains the above-mentioned magnesium oxide, calcium oxide, or zinc oxide, those oxides are present on the outer layer of the surface treatment layer after hot pressing; and thus, phosphate treatability is improved. As a reason for the improvement in phosphate treatability, it is presumed that the chemical conversion reaction with a phosphate is accelerated by magnesium oxide being dissolved in the phosphate treatment liquid. To obtain this effect more efficiently, the particle size of each of the above-mentioned magnesium oxide, calcium oxide, and zinc oxide is preferably more than or equal to 5 nm and less than or equal to 100 nm, and more preferably more than or equal to 10 nm and less than or equal to 50 nm.

In the case where the surface treatment layer contains magnesium oxide, calcium oxide, or zinc oxide, the content thereof is preferably in the range of more than or equal to 0.2 $g/m^2$ and less than or equal to 5 $g/m^2$ per one surface, and more preferably more than or equal to 0.4 $g/m^2$ and less than or equal to 2.5 $g/m^2$ per one surface. In the case where the content of magnesium oxide, calcium oxide, or zinc oxide is less than 0.2 $g/m^2$ per one surface, since those oxides are not sufficiently present after hot pressing, it may be difficult to exhibit satisfactory phosphate treatability. On the other hand, in the case where the content of magnesium oxide, calcium oxide, or zinc oxide exceeds 5 $g/m^2$ per one surface, the cost of the Zn-based plated steel sheet according to the present embodiment is increased, and it is presumed that the cohesive force of the surface treatment layer is weakened and a coating film that is formed on the surface treatment layer after hot pressing is likely to peel off.

The surface treatment layer according to the present embodiment may contain, in addition to oxides like the above, at least one of one or more P-containing compounds, one or more V-containing compounds, one or more Cu-containing compounds, one or more Al-containing compounds, one or more Si-containing compounds, and one or more Cr-containing compounds described in detail below in the range of a predetermined content.

The P-containing compound is a compound containing phosphorus as a constituent element. Examples of the P-containing compound include compounds such as phosphoric acid, phosphorous acid, phosphonic acid, phosphonous acid, phosphinic acid, phosphinous acid, a phosphine oxide, and phosphine, an ionic compound containing any of these compounds as an anion, and the like. All these P-containing compounds are commercially available as reagents or products, and can be easily obtained. These P-containing compounds exist in a state of being dissolved in a treatment liquid or in a state of being dispersed as powder in a treatment liquid, and exist, in the surface treatment layer, in a state of being dispersed as solid.

The V-containing compound is a compound containing vanadium as a constituent element. Examples of the V-containing compound include vanadium oxides such as vanadium pentoxide, metavanadic acid-based compounds such as ammonium metavanadate, vanadium compounds such as sodium vanadate, and other V-containing compounds. Those V-containing compounds are commercially available as reagents or products, and can be easily obtained. Those V-containing compounds exist in a state of being dissolved in a treatment liquid or in a state of being dispersed as powder in a treatment liquid, and exist, in the surface treatment layer, in a state of being dispersed as solid.

The surface treatment layer according to the present embodiment preferably contains one or more compounds selected from one or more P-containing compounds and one or more V-containing compounds mentioned above individually in the range of more than or equal to 0.0 g/m$^2$ and less than or equal to 0.01 g/m$^2$ per one surface on a P and V basis.

One or more compounds selected from one or more P-containing compounds and one or more V-containing compounds mentioned above are oxidized into an oxide during hot pressing, and the oxide exists locally at the interface between the Zn-based plating layer and the surface treatment layer and forms an oxide layer that contains at least one of P and V and has weak cohesive force. Since the content of the one or more compounds selected from one or more P-containing compounds and one or more V-containing compounds contained is individually in the range of more than or equal to 0.0 g/m$^2$ and less than or equal to 0.01 g/m$^2$ per one surface on a P and V basis, the thickness of an oxide layer like the above that is formed during hot pressing and has weak cohesive force is reduced, and the adhesiveness between the Zn-based plating layer and the surface treatment layer after hot pressing is further improved.

In the case where the content of the one or more selected from one or more P-containing compounds and one or more V-containing compounds in the surface treatment layer exceeds 0.01 g/m$^2$ per one surface, the thickness of the oxide layer that is formed during hot pressing and has weak cohesive force is increased; consequently, the adhesiveness between the Zn-based plating layer and the surface treatment layer is reduced, and as a result also adhesiveness after electrodeposition coating is reduced. From the viewpoint of the adhesiveness between the Zn-based plating layer and the surface treatment layer after hot pressing, the content of the one or more compounds selected from one or more P-containing compounds and one or more V-containing compounds in the surface treatment layer is more preferably individually more than or equal to 0.0 g/m$^2$ and less than or equal to 0.003 g/m$^2$ per one surface on a P and V basis.

The Cu-containing compound is a compound containing copper as a constituent element. Examples of the Cu-containing compound include metal Cu, copper oxide, various organic copper compounds, various inorganic copper compounds, and various copper complexes. Those Cu-containing compounds are commercially available as reagents or products, and can be easily obtained. Those Cu-containing compounds exist in a state of being dissolved in a treatment liquid or in a state of being dispersed as powder in a treatment liquid, and exist, in the surface treatment layer, in a state of being dispersed as solid.

The surface treatment layer according to the present embodiment preferably contains one or more compounds selected from one or more Cu-containing compounds mentioned above in the range of more than or equal to 0.0 g/m$^2$ and less than or equal to 0.02 g/m$^2$ per one surface on a Cu basis.

One or more compounds selected from one or more Cu-containing compounds mentioned above are oxidized into an oxide during hot pressing, and the oxide exists locally at the interface between the Zn-based plating layer and the surface treatment layer and forms an oxide layer that contains Cu and has weak cohesive force. Since the content of the one or more compounds selected from one or more Cu-containing compounds is in the range of more than or equal to 0.0 g/m$^2$ and less than or equal to 0.02 g/m$^2$ per one surface on a Cu basis, the thickness of an oxide layer like the above that is formed during hot pressing and has weak cohesive force is reduced, and the adhesiveness between the Zn-based plating layer and the surface treatment layer after hot pressing is further improved.

In the case where the content of the one or more selected from one or more Cu-containing compounds in the surface treatment layer exceeds 0.02 g/m$^2$ per one surface, the thickness of the oxide layer that is formed during hot pressing and has weak cohesive force is increased; consequently, the adhesiveness between the Zn-based plating layer and the surface treatment layer is reduced, and as a result, also adhesiveness after electrodeposition coating is reduced. In addition, since Cu is an element nobler than Fe, which is a main component of the ground steel sheet, also the corrosion resistance tends to decrease. From the viewpoint of the adhesiveness between the Zn-based plating layer and the surface treatment layer after hot pressing, the content of the one or more compounds selected from one or more Cu-containing compounds in the surface treatment layer is more preferably more than or equal to 0.0 g/m$^2$ and less than or equal to 0.005 g/m$^2$ per one surface on a Cu basis.

The Al-containing compound is a compound containing aluminum as a constituent element. Examples of the Al-containing compound include metal Al, aluminum oxide, aluminum hydroxide, an ionic compound containing an aluminum ion as a cation, and the like. Those Al-containing compounds are commercially available as reagents or products, and can be easily obtained. Those Al-containing compounds exist in a state of being dissolved in a treatment liquid or in a state of being dispersed as powder in a treatment liquid, and exist, in the surface treatment layer, in a state of being dispersed as solid.

The Si-containing compound is a compound containing silicon as a constituent element. Examples of the Si-containing compound include Si simple substance, silica (silicon oxide), organic silane, a silicone resin used also as a binder resin, and other Si-containing compounds. All these Si-containing compounds are commercially available as reagents or products, and can be easily obtained. These Si-containing compounds exist in a state of being dissolved in a treatment liquid or in a state of being dispersed as powder in a treatment liquid, and exist, in the surface treatment layer, in a state of being dispersed as solid.

The surface treatment layer according to the present embodiment preferably contains one or more compounds selected from one or more Al-containing compounds and one or more Si-containing compounds like the above individually in the range of more than or equal to 0.0 g/m² and less than or equal to 0.005 g/m² per one surface on an Al and Si basis.

One or more compounds selected from one or more Al-containing compounds and one or more Si-containing compounds like the above are oxidized into an oxide during hot pressing, and the oxide concentrates on the surface of the surface treatment layer. Since the amount of the one or more compounds selected from one or more Al-containing compounds and one or more Si-containing compounds contained is individually in the range of more than or equal to 0.0 g/m² and less than or equal to 0.005 g/m² per one surface on an Al and Si basis, the existence ratio of the oxides containing Al or Si that are formed on the surface of the surface treatment layer during hot pressing is reduced, and the adhesiveness between the surface treatment layer and the electrodeposition coating film after hot pressing is further improved.

In the case where the content of the one or more selected from one or more Al-containing compounds and one or more Si-containing compounds in the surface treatment layer is more than 0.005 g/m² per one surface, the existence ratio of the oxides containing Al or Si that are formed during hot pressing is increased. These oxides containing Al or Si inhibit the formation of a chemical conversion treatment coating film, and reduce the adhesiveness between the surface treatment layer and the electrodeposition coating film after hot pressing; therefore, when the existence ratio of the oxides containing Al or Si that are formed during hot pressing is increased, the adhesiveness between the surface treatment layer and the electrodeposition coating film is reduced. From the viewpoint of the adhesiveness between the surface treatment layer and the electrodeposition coating film after hot pressing (that is, post-coating adhesiveness), the amount of the one or more compounds selected from one or more Al-containing compounds and one or more Si-containing compounds contained in the surface treatment layer is more preferably individually more than or equal to 0.0 g/m² and less than or equal to 0.002 g/m² per one surface on an Al and Si basis.

The Cr-containing compound is a compound containing chromium as a constituent element. Examples of the Cr-containing compound include metal Cr, chromium compounds having various valences, and an ionic compound containing a chromium ion having any of various valences as a cation. Those Cr-containing compounds exist in a state of being dissolved in a treatment liquid or in a state of being dispersed as powder in a treatment liquid, and exist, in the surface treatment layer, in a state of being dispersed as solid.

The Cr-containing compound varies in performance and properties in accordance with the valence, and many hexavalent chromium compounds are harmful. In view of the current tendency of attention to environmental protection being strongly required, the surface treatment layer according to the present embodiment preferably contains as little amount of Cr-containing compounds mentioned above as possible, and is more preferably chromium-free.

From the view point mentioned above, the surface treatment layer according to the present embodiment preferably contains one or more compounds selected from Cr-containing compounds like the above in the range of more than or equal to 0.0 g/m² and less than or equal to 0.01 g/m² per one surface on an Cr basis, and is more preferably chromium-free.

The surface treatment layer may contain pigments such as carbon black and titania, various anti-corrosive particles used for coated steel sheets, and the like as long as the effect of the present invention based on containing one or more oxides selected from titanium oxide, nickel oxide, and tin(IV) oxide is not inhibited. Also in this case, the surface treatment layer contains the one or more oxides selected from titanium oxide, nickel oxide, and tin(IV) oxide in the range of more than or equal to 0.2 g/m² and less than or equal to 2 g/m² per one surface.

As the method for forming the surface treatment layer, a treatment liquid containing one or more oxides selected from titanium oxide, nickel oxide, and tin(IV) oxide may be applied to the surface of a zinc-plated steel sheet, and drying and baking may be performed.

The coating method is not limited to a specific method, and examples include a method in which a ground steel sheet is dipped in a treatment liquid or a treatment liquid is sprayed to the surface of a ground steel sheet, and then the attached amount is controlled by a roll or gas spraying so as to obtain a prescribed attached amount, and a method of coating using a roll coater or a bar coater.

The method of drying and baking is not limited to a specific method, either, as long as it is a method that can volatilize a dispersion medium (mainly water). Here, if heating is performed at an excessively high temperature, it is feared that the uniformity of the surface treatment layer will be reduced; conversely, if heating is performed at an excessively low temperature, it is feared that productivity will be reduced. Thus, to produce a surface treatment layer having excellent characteristics stably and efficiently, the surface treatment layer after coating is preferably heated at a temperature of approximately 80° C. to 150° C. for approximately 5 seconds to 20 seconds.

The formation of the surface treatment layer is preferably performed in-line in the production line of the plated steel sheet because this is economical; but the surface treatment layer may be formed also in another line, or may be formed after blanking for molding is performed.

Here, the content of the one or more oxides selected from titanium oxide, nickel oxide, and tin(IV) oxide in the surface treatment layer can be measured by a known method; for example, the fact that the various compounds are the one or more oxides selected from titanium oxide, nickel oxide, and tin(IV) oxide is checked beforehand by cross-sectional energy dispersive X-ray (EDX) analysis or the like, and then the coating film is dissolved; thus, the measurement can be made using inductively coupled plasma (ICP) emission spectrometric analysis or the like. Also, the content of other oxides that are preferably contained in the surface treatment layer, and the content of the above-mentioned one or more P-containing compounds, V-containing compounds, Cu-containing compounds, Al-containing compounds, Si-containing compounds, and Cr-containing compounds contained in the surface treatment layer can be measured by a similar method.

<2. Regarding Hot Pressing Process>

In the case where the hot pressing method is used for a hot-dip Zn-based plated steel sheet like that described above, the hot-dip Zn-based plated steel sheet is heated to a prescribed temperature, and is then press-molded. In the case of the hot-dip Zn-based plated steel sheet according to the present embodiment, heating is usually performed to 700 to 1000° C. because hot press molding is performed; but in the case where a martensite single phase is formed after rapid cooling or martensite is formed at a volume ratio of 90% or more, it is important that the lower limit of the heating temperature be the $Ac_3$ point or more. In the case of the present invention, also the case where a two-phase region of martensite/ferrite is formed after rapid cooling is included, and therefore the heating temperature is preferably 700 to 1000° C. as described above.

Examples of the hot pressing method include two methods of hot pressing by slow heating and hot pressing by rapid heating. Examples of the heating method used include heating with an electric furnace or a gas furnace, flame heating, energization heating, high-frequency heating, and induction heating, and the atmosphere during heating is not particularly limited; as a heating method to obtain the effect of the present invention significantly, energization heating, induction heating, and the like, which are rapid heating, are preferably used.

In the hot pressing method by slow heating, the radiation heating of a heating furnace is used. First, the hot-dip Zn-based plated steel sheet according to the present embodiment that is used as a steel sheet for hot pressing is placed in a heating furnace (a gas furnace, an electric furnace, or the like). The steel sheet for hot pressing is heated at 700 to 1000° C. in the heating furnace, and is, depending on the condition, kept at this heating temperature (soaking). Thereby, molten Zn in the hot-dip Zn-based plating layer is combined with Fe and forms a solid phase (Fe—Zn solid solution phase). After the molten Zn in the hot-dip Zn-based plating layer is combined with Fe and forms a solid phase, the steel sheet is taken out of the heating furnace. Alternatively, by combining molten Zn in the hot-dip Zn-based plating layer with Fe by soaking, the solid phase may be formed as an Fe—Zn solid solution phase and a ZnFe alloy phase; and then the steel sheet may be taken out of the heating furnace.

Alternatively, the Zn-based plated steel sheet may be heated to 700 to 1000° C. while no keeping time is provided or the keeping time is set to a short time, and the steel sheet may be taken out of the heating furnace. In this case, after the steel sheet is heated to 700 to 1000° C., cooling is performed without applying stress to the steel sheet by press molding or the like until Zn in the Zn-based plating layer is combined with Fe and forms a solid phase (Fe—Zn solid solution phase or ZnFe alloy phase). Specifically, cooling is performed until at least the temperature of the steel sheet becomes lower than or equal to 782° C. After the cooling, as described below, cooling is performed while the steel sheet is pressed using a mold.

Also in hot pressing by rapid heating, similarly, the Zn-based plated steel sheet according to the present embodiment that is used as a steel sheet for hot pressing is rapidly heated to 700 to 1000° C. The rapid heating is performed by, for example, energization heating or induction heating. The average heating rate in this case is 20° C./second or more. In the case of rapid heating, after the Zn-based plated steel sheet hot-dip Zn-based plated steel sheet is heated to 700 to 1000° C., cooling is performed without applying stress to the steel sheet by press molding or the like until Zn in the Zn-based plating layer is combined with Fe and forms a solid phase (Fe—Zn solid solution phase or ZnFe alloy phase). Specifically, cooling is performed until at least the temperature of the steel sheet becomes lower than or equal to 782° C. After the cooling, as described below, cooling is performed while the steel sheet is pressed using a mold.

The taken-out steel sheet is pressed using a mold. When pressing the steel sheet, the steel sheet is cooled by the mold. A cooling medium (for example, water or the like) is circulated through the mold, and the mold removes heat from the steel sheet and cools it. By the above process, a hot pressed steel material is produced by normal heating.

The hot pressed steel material produced using the Zn-based plated steel sheet having the surface treatment layer according to the present embodiment can exhibit satisfactory post-coating adhesiveness, because even if chemical conversion treatment after hot pressing is insufficient due to influences of treatment time, concentration, temperature, and the like, one or more oxides selected from titanium oxide, nickel oxide, and tin(IV) formed on the surface of the steel sheet exhibit excellent adhesiveness with the electrodeposition coating film.

EXAMPLES

The action and effect of the Zn-based plated steel sheet according to an embodiment of the present invention will now be described still more specifically with reference to Examples. Examples shown below are only examples of the Zn-based plated steel sheet according to the present invention, and the Zn-based plated steel sheet according to the present invention is not limited to Examples below.

<Ground Steel Sheet>

In the following, first, pieces of molten steel having the chemical compositions shown in Table 1 below were produced. After that, the produced pieces of molten steel were used to produce slabs by the continuous casting method. The obtained slab was hot rolled to produce a hot rolled steel sheet. Subsequently, the hot rolled steel sheet was pickled, and then cold rolling was performed to produce a cold rolled steel sheet; thus, steel sheets of steel #1 to #8 having the chemical compositions described in Table 1 were prepared. As shown in Table 1, the sheet thicknesses of the steel sheets of all the steel types were 1.6 mm.

TABLE 1

| Type of steel | Sheet thickness (mm) | Chemical composition (mass %, the balance: Fe and impurities) | | | | | | | | | | | |
|---|---|---|---|---|---|---|---|---|---|---|---|---|---|
| | | C | Si | Mn | P | S | sol.Al | N | B | Ti | Cr | Mo | Nb | Ni |
| #1 | 1.6 | 0.2 | 0.2 | 1.3 | 0.01 | 0.005 | 0.02 | 0.002 | 0.002 | 0.02 | 0.2 | — | — | — |
| #2 | 1.6 | 0.2 | 0.5 | 1.3 | 0.01 | 0.005 | 0.02 | 0.002 | 0.002 | 0.02 | 0.2 | — | — | — |
| #3 | 1.6 | 0.2 | 0.5 | 1.3 | 0.01 | 0.005 | 0.02 | 0.002 | 0.002 | 0.02 | 0.2 | — | 0.05 | — |
| #4 | 1.6 | 0.2 | 0.5 | 1.3 | 0.01 | 0.005 | 0.02 | 0.002 | 0.002 | 0.02 | 0.2 | — | — | 1 |
| #5 | 1.6 | 0.2 | 0.5 | 1.3 | 0.01 | 0.005 | 0.02 | 0.002 | 0.002 | 0.02 | 0.2 | 0.5 | — | — |
| #6 | 1.6 | 0.2 | 0.5 | 1.3 | 0.01 | 0.005 | 0.02 | 0.002 | — | — | — | — | — | — |
| #7 | 1.6 | 0.2 | 0.2 | 0.2 | 0.01 | 0.005 | 0.02 | 0.002 | 0.002 | 0.02 | 0.2 | — | — | — |
| #8 | 1.6 | 0.2 | 0.2 | 0.4 | 0.01 | 0.005 | 0.02 | 0.002 | 0.002 | 0.02 | 0.2 | — | — | — |

<Zn-Based Plating Layer>

The steel sheets of steel #1 to #8 were subjected to hot-dip galvanizing treatment, and were then subjected to alloying treatment. With the maximum temperature in each alloying treatment set to 530° C., heating was performed for approximately 30 seconds; and then cooling was performed to room temperature; thus, an alloyed hot-dip galvanized steel sheet (GA) was produced. Using steel #1, hot-dip galvanizing treatment was performed, and a hot-dip galvanized steel sheet (GI) was produced without performing alloying treatment.

Further, steel #1 was subjected to various types of hot-dip galvanizing using three types of plating baths of molten Zn-55% Al, molten Zn-6% Al-3% Mg, and molten Zn-11% Al-3% Mg-0.2% Si, and hot-dip zinc-based plated steel sheets A1 to A3 were produced.

A1: molten Zn-55% AL
A2: molten Zn-6% Al-3% Mg
A3: molten Zn-11% Al-3% Mg-0.2% Si In addition, steel #1 was subjected to various types of Zn-based plating of Zn electroplating, Zn—Ni electroplating, and Zn—Co electroplating.

Note that, as a specific plating operation in the case of using electroplating, electrolysis treatment was performed in an electrolyte solution containing Zn ions, using the steel sheet, as a negative electrode, and a counter electrode. The amount of plating attached to the steel sheet was controlled by the composition of the electrolyte solution, the current density, and the electrolysis time.

A4: Zn electroplating
A5: Zn—Ni electroplating
A6: Zn—Co electroplating

In the eight types of Zn-based plating processes mentioned above, the amount of the Zn-based plating layer attached was equally set to 60 g/m$^2$ per one surface.

<Surface Treatment Layer>

Subsequently, in order to prepare a chemical solution having the compositions shown in Table 2 in a solid content ratio, the following oxides and chemical agents were blended using water. The obtained treatment liquid was applied with a bar coater, and drying was performed using an oven under conditions for keeping a maximum peak temperature of 100° C. for 8 seconds; thus, a plated steel sheet for hot pressing was produced. The amount of the treatment liquid attached was adjusted by the dilution of the liquid and the count of the bar coater so that the total amount of attached nonvolatile content in the treatment liquid might be the numerical value shown in Table 3. In Table 2 below, the solid content concentration of each component is written as the ratio of the nonvolatile content of each component, such as "oxide A," to the nonvolatile content of the entire treatment liquid (unit:mass %).

The components (symbols) in Table 2 are as follows.

As described later, also a treatment liquid containing alumina (sol) was investigated as granular substances other than titanium oxide, nickel oxide, and tin(IV) oxide; in this case, alumina is denoted by "oxide A". Similarly, zirconia, lanthanum oxide, cerium oxide, and neodymium oxide are denoted by "oxide B", and magnesium oxide, calcium oxide, and zinc oxide are denoted by "oxide C".

(Oxide A) titanium oxide, nickel oxide, tin(IV) oxide, and alumina

TPA: titania powder (manufactured by IoLiTec GmbH), particle size: 10 to 30 nm (catalog value)

TPB: titania powder (TITANIX JA-1, manufactured by Tayca Corporation), particle size: 180 nm (catalog value)

Ti: titania sol (titania sol TKS-203, manufactured by Tayca Corporation), particle size: 6 nm (catalog value)

Ni: nickel oxide (nickel oxide, manufactured by IoLiTec GmbH), particle size 20 nm NP: nickel oxide (nickel oxide, manufactured by Japan Pure Chemical Co., Ltd.), particle size: approximately 7 μm Sn: tin(IV) oxide sol (Ceramase C-10, manufactured by Taki Chemical Co., Ltd.), particle size: 10 nm SP: tin(IV) oxide (tin oxide, manufactured by IoLiTec GmbH), particle size: 10 to 20 nm AZ: an alumina sol (alumina sol 200, manufactured by Nissan Chemical Industries, Ltd.), particle size: approximately 10 nm (Oxide B) zirconia, lanthanum oxide, cerium oxide, and neodymium oxide ZA: a zirconia sol (NanoUse (registered trademark) ZR-30AL, manufactured by Nissan Chemical Industries, Ltd.), particle size: 70 to 110 nm (catalog value)

La: a lanthanum oxide sol (Biral La-C10, manufactured by Taki Chemical Co., Ltd.), particle size: 40 nm (catalog value)

Ce: a cerium oxide sol (Needlal P-10, manufactured by Taki Chemical Co., Ltd.), particle size: 20 nm (catalog value)

Nd: a neodymium oxide sol (Biral Nd-C10, manufactured by Taki Chemical Co., Ltd.), particle size: 40 nm (catalog value)

(Oxide C) magnesium oxide, calcium oxide, and zinc oxide

Mg: magnesium oxide (manufactured by IoLiTec GmbH), particle size: 35 nm (catalog value)

Ca: calcium oxide (manufactured by Kanto Chemical Co., Inc.)

*Used after being dispersed in resin-added water and pulverizing pigment with a ball mill.

Zn: zinc oxide (manufactured by IoLiTec GmbH), particle size: 20 nm (catalog value)

(iii) Resin

A: a urethane-based resin emulsion (Superflex (registered trademark) 150, manufactured by DKS Co. Ltd.)

B: a urethane-based resin emulsion (Superflex (registered trademark) E-2000, manufactured by DKS Co. Ltd.)

C: a polyester resin emulsion (Vylonal (registered trademark) MD1480, manufactured by Toyobo Co., Ltd.)

(iv) Crosslinking Agent

M: a melamine resin (Cymel (registered trademark) 325, manufactured by Mitsui Cytec Ltd.)

Z: ammonium zirconium carbonate (an ammonium zirconium carbonate solution, manufactured by Kishida Chemical Co., Ltd.)

S: a silane coupling agent (Sila-Ace S510, manufactured by Nichibi Trading Co., LTD.) (a Si-containing compound)

(v) Pigment

CB: carbon black (Mitsubishi (registered trademark) carbon black #1000, manufactured by Mitsubishi Chemical Corporation)

T: titanium oxide (titanium oxide R-930, manufactured by Ishihara Sangyo Kaisha, Ltd.), particle size: 250 nm (catalog value)

"T" titanium oxide described herein is a pigment with a particle size of 200 to 400 nm mainly used for a white pigment or the like in a coating material, and cannot achieve performance obtained by oxide B because the particle size is larger than that of (oxide A).

PA: condensed Al phosphate (condensed aluminum phosphate, K-White ZF150W, manufactured by Tayca Corporation) (a P and Al-containing compound)

PZ: zinc phosphite (NP-530, manufactured by Toho Ganryo Co., Ltd.) (a P-containing compound)

Si1: silica particles (Sylomask 02, manufactured by Fuji Silysia Chemical Ltd.) (a Si-containing compound)

Si2: colloidal silica (Snowtex O, manufactured by Nissan Chemical Industries, Ltd.) (a Si-containing compound)

Al: an alumina sol (AS-200, manufactured by Nissan Chemical Industries, Ltd.) (an Al-containing compound)

V: potassium vanadate (a general reagent) (a V-containing compound)

Cr: Cr(VI) oxide (a general reagent) (a Cr-containing compound)

Cu: copper(II) oxide (a general reagent) (a Cu-containing compound)

TABLE 2

| | Oxide A | | Oxide B | | Oxide C | | Resin | | Crosslinking agent | | Pigment, etc. | | |
|---|---|---|---|---|---|---|---|---|---|---|---|---|---|
| | Type | Concentration (mass %) | Type | Concentration (mass %) | Type | Concentration (mass %) | Type | Concentration (mass %) | Type | Concentration (mass %) | Type | Concentration (mass %) | Notes |
| 1 | Ti | 100 | — | 0 | — | 0 | — | 0 | — | 0 | — | 0 | |
| 2 | Ti | 75 | — | 0 | — | 0 | B | 25 | — | 0 | — | 0 | |
| 3 | Ti | 40 | — | 0 | — | 0 | B | 60 | — | 0 | — | 0 | |
| 4 | Ti | 20 | — | 0 | — | 0 | B | 80 | — | 0 | — | 0 | |
| 5 | Ti | 50 | — | 0 | — | 0 | B | 50 | — | 0 | — | 0 | |
| 6 | Ti | 50 | — | 0 | — | 0 | B | 45 | Z | 5 | — | 0 | |
| 7 | Ti | 50 | — | 0 | — | 0 | B | 45 | S | 5 | — | 0 | |
| 8 | Ti | 50 | — | 0 | — | 0 | B | 45 | — | 0 | CB | 5 | |
| 9 | Ti | 50 | — | 0 | — | 0 | B | 45 | — | 0 | T | 5 | |
| 10 | Ti | 50 | — | 0 | — | 0 | B | 40 | — | 0 | PA | 10 | |
| 11 | Ti | 50 | — | 0 | — | 0 | B | 40 | — | 0 | Si | 10 | |
| 12 | TPA | 100 | — | 0 | — | 0 | — | 0 | — | 0 | — | 0 | |
| 13 | TPA | 50 | — | 0 | — | 0 | A | 50 | — | 0 | — | 0 | |
| 14 | TPB | 100 | — | 0 | — | 0 | — | 0 | — | 0 | — | 0 | |
| 15 | TPB | 50 | — | 0 | — | 0 | A | 50 | — | 0 | — | 0 | |
| 16 | Ni | 50 | — | 0 | — | 0 | B | 50 | — | 0 | — | 0 | |
| 17 | Sn | 50 | — | 0 | — | 0 | B | 50 | — | 0 | — | 0 | |
| 18 | SP | 50 | — | 0 | — | 0 | B | 50 | — | 0 | — | 0 | |
| 19 | NP | 50 | — | 0 | — | 0 | B | 50 | — | 0 | — | 0 | |
| 20 | Ti:Ni = 1:1 | 50 | — | 0 | — | 0 | B | 50 | — | 0 | — | 0 | |
| 21 | Ti:Ni = 1:1 | 50 | — | 0 | — | 0 | B | 40 | — | 0 | PA | 10 | |
| 22 | Ti:Sn = 1:1 | 50 | — | 0 | — | 0 | B | 50 | — | 0 | — | 0 | |
| 23 | Ti:Sn = 11 | 50 | — | 0 | — | 0 | B | 40 | — | 0 | PA | 10 | |
| 24 | Ti:SP = 1:1 | 50 | — | 0 | — | 0 | B | 50 | — | 0 | — | 0 | |
| 25 | Ti:SP = 1:1 | 50 | — | 0 | — | 0 | B | 40 | — | 0 | PA | 10 | |
| 26 | Ti:Ni:Sn = 1:1:1 | 60 | — | 0 | — | 0 | B | 40 | — | 0 | — | 0 | |
| 27 | Ti:Ni:SP = 1:1:1 | 60 | — | 0 | — | 0 | B | 40 | — | 0 | — | 0 | |
| 28 | Ni:Sn:SP = 1:1:1 | 60 | — | 0 | — | 0 | B | 40 | — | 0 | — | 0 | |
| 29 | AZ | 100 | — | 0 | — | 0 | — | 0 | — | 0 | — | 0 | |
| 30 | AZ | 50 | — | 0 | — | 0 | B | 50 | — | 0 | — | 0 | |
| 31 | — | 0 | — | 0 | — | 0 | A | 100 | — | 0 | — | 0 | |
| 32 | — | 0 | — | 0 | — | 0 | — | 0 | — | 0 | — | 0 | |
| 33 | Ti | 25 | ZA | 25 | — | 0 | B | 35 | S | 5 | PA | 10 | |
| 34 | Ti | 25 | ZA | 25 | — | 0 | B | 35 | S | 5 | Si | 10 | |
| 35 | Ti | 25 | ZA | 25 | — | 0 | B | 35 | Z | 5 | PA | 10 | |
| 36 | Ti | 25 | ZA | 25 | — | 0 | B | 35 | Z | 5 | Si | 10 | |
| 37 | Ti | 30 | ZA | 30 | — | 0 | B | 40 | — | 0 | — | 0 | |
| 38 | Ti | 30 | La | 30 | — | 0 | B | 40 | — | 0 | — | 0 | |
| 39 | Ti | 30 | Ce | 30 | — | 0 | B | 40 | — | 0 | — | 0 | |
| 40 | Ti | 30 | Nd | 30 | — | 0 | B | 40 | — | 0 | — | 0 | |
| 41 | Ti | 20 | ZA | 50 | — | 0 | B | 30 | — | 0 | — | 0 | |
| 42 | Ti | 10 | ZA | 50 | — | 0 | B | 40 | — | 0 | — | 0 | |
| 43 | Ti | 5 | ZA | 5 | — | 0 | B | 90 | — | 0 | — | 0 | |
| 44 | Ti | 30 | ZA | 50 | — | 0 | B | 20 | — | 0 | — | 0 | |
| 45 | Ni | 30 | ZA | 30 | — | 0 | B | 40 | — | 0 | — | 0 | |
| 46 | Sn | 30 | ZA | 30 | — | 0 | B | 40 | — | 0 | — | 0 | |
| 47 | Ti | 20 | — | 0 | Mg | 30 | B | 35 | S | 5 | PA | 10 | |
| 48 | Ti | 20 | — | 0 | Mg | 30 | B | 35 | S | 5 | Si | 10 | |
| 49 | Ti | 20 | — | 0 | Mg | 30 | B | 35 | Z | 5 | PA | 10 | |
| 50 | Ti | 20 | — | 0 | Mg | 30 | B | 35 | Z | 5 | Si | 10 | |
| 51 | Ti | 25 | — | 0 | Mg | 35 | B | 40 | — | 0 | — | 0 | |
| 52 | Ni | 25 | — | 0 | Mg | 35 | B | 40 | — | 0 | — | 0 | |
| 53 | Ni | 20 | — | 0 | Mg | 30 | B | 35 | S | 5 | PA | 10 | |
| 54 | Ni | 20 | — | 0 | Mg | 30 | B | 35 | S | 5 | Si | 10 | |
| 55 | Sn | 25 | — | 0 | Mg | 35 | B | 40 | — | 0 | — | 0 | |
| 56 | Sn | 20 | — | 0 | Mg | 30 | B | 35 | S | 5 | PA | 10 | |
| 57 | SP | 50 | — | 0 | Mg | 20 | B | 30 | — | 0 | — | 0 | |
| 58 | SP | 20 | — | 0 | Mg | 30 | B | 35 | S | 5 | PA | 10 | |
| 59 | Ti | 5 | — | 0 | Mg | 5 | B | 90 | — | 0 | — | 0 | |
| 60 | Ti | 50 | — | 0 | Mg | 30 | B | 20 | — | 0 | — | 0 | |
| 61 | Ti | 20 | ZA | 20 | Mg | 30 | B | 30 | — | 0 | — | 0 | |
| 62 | Ni | 20 | ZA | 20 | Mg | 30 | B | 30 | — | 0 | — | 0 | |
| 63 | Sn | 20 | ZA | 20 | Mg | 30 | B | 30 | — | 0 | — | 0 | |
| 64 | Ti | 20 | La | 20 | Mg | 30 | B | 30 | — | 0 | — | 0 | |
| 65 | Ti | 20 | Ce | 20 | Mg | 30 | B | 30 | — | 0 | — | 0 | |
| 66 | Ti | 20 | Nd | 20 | Mg | 30 | B | 30 | — | 0 | — | 0 | |

TABLE 2-continued

| | Oxide A | | Oxide B | | Oxide C | | Resin | | Crosslinking agent | | Pigment, etc. | | |
|---|---|---|---|---|---|---|---|---|---|---|---|---|---|
| | Type | Concentration (mass %) | Type | Concentration (mass %) | Type | Concentration (mass %) | Type | Concentration (mass %) | Type | Concentration (mass %) | Type | Concentration (mass %) | Notes |
| 67 | Ti | 20 | ZA | 20 | Mg | 30 | B | 20 | S | 5 | PA | 5 | |
| 68 | Ti | 20 | ZA | 20 | Mg | 30 | B | 20 | S | 5 | Si | 5 | |
| 69 | Ti | 20 | ZA | 20 | Mg | 30 | B | 20 | Z | 5 | PA | 5 | |
| 70 | Ti | 20 | Za | 20 | Mg | 30 | B | 20 | Z | 5 | Si | 5 | |
| 71 | Ti | 20 | La | 20 | Mg | 30 | B | 20 | S | 5 | PA | 5 | |
| 72 | Ti | 20 | La | 20 | Mg | 30 | B | 20 | S | 5 | Si | 5 | |
| 73 | Ti | 20 | La | 20 | Mg | 30 | B | 20 | Z | 5 | PA | 5 | |
| 74 | Ti | 20 | La | 20 | Mg | 30 | B | 20 | Z | 5 | Si | 5 | |
| 75 | Ti | 25 | — | | Ca | 35 | B | 40 | — | 0 | — | 0 | |
| 76 | Ti | 25 | — | | Zn | 35 | B | 40 | — | 0 | — | 0 | |
| 77 | Ti | 20 | ZA | 20 | Ca | 30 | B | 30 | — | 0 | — | 0 | |
| 78 | Ti | 20 | ZA | 20 | Zn | 30 | B | 30 | — | 0 | — | 0 | |
| 79 | Ni | 20 | ZA | 20 | Ca | 30 | B | 30 | — | 0 | — | 0 | |
| 80 | Ni | 20 | ZA | 20 | Zn | 30 | B | 30 | — | 0 | — | 0 | |
| 81 | Sn | 20 | ZA | 20 | Ca | 30 | B | 30 | — | 0 | — | 0 | |
| 82 | Sn | 20 | ZA | 20 | Zn | 30 | B | 30 | — | 0 | — | 0 | |
| 83 | Ti:Ni = 1:1 | 30 | ZA | 30 | — | 0 | B | 40 | — | 0 | — | 0 | |
| 84 | Ti:Sn = 1:1 | 30 | ZA | 30 | — | 0 | B | 40 | — | 0 | — | 0 | |
| 85 | Ti:SP = 1:1 | 30 | ZA | 30 | — | 0 | B | 40 | — | 0 | — | 0 | |
| 86 | Ti:Ni:Sn = 1:1:1 | 30 | ZA | 30 | — | 0 | B | 40 | — | 0 | — | 0 | |
| 87 | Ti:Ni = 1:1 | 30 | La | 30 | — | 0 | B | 40 | — | 0 | — | 0 | |
| 88 | Ti:Sn = 1:1 | 30 | La | 30 | — | 0 | B | 40 | — | 0 | — | 0 | |
| 89 | Ti:SP = 1:1 | 30 | La | 30 | — | 0 | B | 40 | — | 0 | — | 0 | |
| 90 | Ti:Ni:Sn = 1:1:1 | 30 | La | 30 | — | 0 | B | 40 | — | 0 | — | 0 | |
| 91 | Ti:Ni = 1:1 | 30 | ZA:La = 1:1 | 30 | — | 0 | B | 40 | — | 0 | — | 0 | |
| 92 | Ti:Sn = 1:1 | 30 | ZA:La = 1:1 | 30 | — | 0 | B | 40 | — | 0 | — | 0 | |
| 93 | Ti:SP = 1:1 | 30 | ZA:La = 1:1 | 30 | — | 0 | B | 40 | — | 0 | — | 0 | |
| 94 | Ti:Ni:Sn = 1:1:1 | 30 | ZA:La = 1:1 | 30 | — | 0 | B | 40 | — | 0 | — | 0 | |
| 95 | Ti:Ni = 1:1 | 20 | ZA | 20 | Mg | 30 | B | 30 | — | 0 | — | 0 | |
| 96 | Ti:Ni = 1:1 | 20 | ZA | 20 | Mg | 30 | B | 30 | — | 0 | — | 0 | |
| 97 | Ti | 50 | — | 0 | — | 0 | B | 48 | — | 0 | Al | 2 | |
| 98 | Ti | 50 | — | 0 | — | 0 | B | 49.1 | — | 0 | Al | 0.9 | |
| 99 | Ti | 50 | — | 0 | — | 0 | B | 49.7 | — | 0 | Al | 0.3 | |
| 100 | Ti | 50 | — | 0 | — | 0 | B | 48 | — | 0 | Si2 | 2 | |
| 101 | Ti | 50 | — | 0 | — | 0 | B | 49 | — | 0 | Si2 | 1 | |
| 102 | Ti | 50 | — | 0 | — | 0 | B | 49.7 | — | 0 | Si2 | 0.3 | |
| 103 | Ti | 50 | — | 0 | — | 0 | B | 45 | — | 0 | PZ | 5 | |
| 104 | Ti | 50 | — | 0 | — | 0 | B | 48 | — | 0 | PZ | 2 | |
| 105 | Ti | 50 | — | 0 | — | 0 | B | 49.5 | — | 0 | PZ | 0.5 | |
| 106 | Ti | 50 | — | 0 | — | 0 | B | 46 | — | 0 | V | 4 | |
| 107 | Ti | 50 | — | 0 | — | 0 | B | 48 | — | 0 | V | 2 | |
| 108 | Ti | 50 | — | 0 | — | 0 | B | 49.5 | — | 0 | V | 0.5 | |
| 109 | Ti | 50 | — | 0 | — | 0 | B | 46 | — | 0 | Cu | 4 | |
| 110 | Ti | 50 | — | 0 | — | 0 | B | 48 | — | 0 | Cu | 2 | |
| 111 | Ti | 50 | — | 0 | — | 0 | B | 49.5 | — | 0 | Cu | 0.5 | |
| 112 | Ti | 50 | — | 0 | — | 0 | B | 48 | — | 0 | Cr | 2 | |
| 113 | Ti | 50 | — | 0 | — | 0 | B | 49.2 | — | 0 | Cr | 0.8 | |
| 114 | Ti | 30 | ZA | 30 | — | 0 | B | 49 | — | 0 | Al | 1 | |
| 115 | Ti | 30 | ZA | 30 | — | 0 | B | 49.6 | — | 0 | Al | 0.4 | |
| 116 | Ti | 30 | ZA | 30 | — | 0 | B | 49.9 | — | 0 | Al | 0.1 | |
| 117 | Ti | 30 | ZA | 30 | — | 0 | B | 49 | — | 0 | Si2 | 1 | |
| 118 | Ti | 30 | ZA | 30 | — | 0 | B | 49.5 | — | 0 | Si2 | 0.5 | |
| 119 | Ti | 30 | ZA | 30 | — | 0 | B | 49.9 | — | 0 | Si2 | 0.1 | |
| 120 | Ti | 30 | ZA | 30 | — | 0 | B | 47 | — | 0 | PZ | 3 | |
| 121 | Ti | 30 | ZA | 30 | — | 0 | B | 49 | — | 0 | PZ | 1 | |
| 122 | Ti | 30 | ZA | 30 | — | 0 | B | 49.8 | — | 0 | PZ | 0.2 | |
| 123 | Ti | 30 | ZA | 30 | — | 0 | B | 48 | — | 0 | V | 2 | |
| 124 | Ti | 30 | ZA | 30 | — | 0 | B | 49 | — | 0 | V | 1 | |
| 125 | Ti | 30 | ZA | 30 | — | 0 | B | 49.8 | — | 0 | V | 0.2 | |
| 126 | Ti | 30 | ZA | 30 | — | 0 | B | 48 | — | 0 | Cu | 2 | |
| 127 | Ti | 30 | ZA | 30 | — | 0 | B | 49 | — | 0 | Cu | 1 | |
| 128 | Ti | 30 | ZA | 30 | — | 0 | B | 49.8 | — | 0 | Cu | 0.2 | |
| 129 | Ti | 30 | ZA | 30 | — | 0 | B | 49 | — | 0 | Cr | 1 | |
| 130 | Ti | 30 | ZA | 30 | — | 0 | B | 49.6 | — | 0 | Cr | 0.4 | |
| 131 | Ti | 25 | — | 0 | Mg | 35 | B | 49.2 | — | 0 | Al | 0.8 | |
| 132 | Ti | 25 | — | 0 | Mg | 35 | B | 49.6 | — | 0 | Al | 0.4 | |
| 133 | Ti | 25 | — | 0 | Mg | 35 | B | 49.9 | — | 0 | Al | 0.1 | |
| 134 | Ti | 25 | — | 0 | Mg | 35 | B | 49.2 | — | 0 | Si2 | 0.8 | |
| 135 | Ti | 25 | — | 0 | Mg | 35 | B | 49.6 | — | 0 | Si2 | 0.4 | |
| 136 | Ti | 25 | — | 0 | Mg | 35 | B | 49.9 | — | 0 | Si2 | 0.1 | |
| 137 | Ti | 25 | — | 0 | Mg | 35 | B | 47 | — | 0 | PZ | 3 | |
| 138 | Ti | 25 | — | 0 | Mg | 35 | B | 49 | — | 0 | PZ | 1 | |
| 139 | Ti | 25 | — | 0 | Mg | 35 | B | 49.6 | — | 0 | PZ | 0.4 | |
| 140 | Ti | 25 | — | 0 | Mg | 35 | B | 48 | — | 0 | V | 2 | |

TABLE 2-continued

|  | Oxide A | | Oxide B | | Oxide C | | Resin | | Crosslinking agent | | Pigment, etc. | | |
| --- | --- | --- | --- | --- | --- | --- | --- | --- | --- | --- | --- | --- | --- |
|  | Type | Concentration (mass %) | Type | Concentration (mass %) | Type | Concentration (mass %) | Type | Concentration (mass %) | Type | Concentration (mass %) | Type | Concentration (mass %) | Notes |
| 141 | Ti | 25 | — | 0 | Mg | 35 | B | 49 | — | 0 | V | 1 | |
| 142 | Ti | 25 | — | 0 | Mg | 35 | B | 49.7 | — | 0 | V | 0.3 | |
| 143 | Ti | 25 | — | 0 | Mg | 35 | B | 48 | — | 0 | Cu | 2 | |
| 144 | Ti | 25 | — | 0 | Mg | 35 | B | 49 | — | 0 | Cu | 1 | |
| 145 | Ti | 25 | — | 0 | Mg | 35 | B | 49.8 | — | 0 | Cu | 0.2 | |
| 146 | Ti | 25 | — | 0 | Mg | 35 | B | 48.5 | — | 0 | Cr | 1.5 | |
| 147 | Ti | 25 | — | 0 | Mg | 35 | B | 49.5 | — | 0 | Cr | 0.5 | |
| 148 | Ti | 20 | ZA | 20 | Mg | 30 | B | 49.3 | — | 0 | Al | 0.7 | |
| 149 | Ti | 20 | ZA | 20 | Mg | 30 | B | 49.7 | — | 0 | Al | 0.3 | |
| 150 | Ti | 20 | ZA | 20 | Mg | 30 | B | 49.9 | — | 0 | Al | 0.1 | |
| 151 | Ti | 20 | ZA | 20 | Mg | 30 | B | 49.4 | — | 0 | Si2 | 0.6 | |
| 152 | Ti | 20 | ZA | 20 | Mg | 30 | B | 49.7 | — | 0 | Si2 | 0.3 | |
| 153 | Ti | 20 | ZA | 20 | Mg | 30 | B | 49.9 | — | 0 | Si2 | 0.1 | |
| 154 | Ti | 20 | ZA | 20 | Mg | 30 | B | 48 | — | 0 | PZ | 2 | |
| 155 | Ti | 20 | ZA | 20 | Mg | 30 | B | 49.4 | — | 0 | PZ | 0.6 | |
| 156 | Ti | 20 | ZA | 20 | Mg | 30 | B | 49.8 | — | 0 | PZ | 0.2 | |
| 157 | Ti | 20 | ZA | 20 | Mg | 30 | B | 48.8 | — | 0 | V | 1.2 | |
| 158 | Ti | 20 | ZA | 20 | Mg | 30 | B | 49.4 | — | 0 | V | 0.6 | |
| 159 | Ti | 20 | ZA | 20 | Mg | 30 | B | 49.8 | — | 0 | V | 0.2 | |
| 160 | Ti | 20 | ZA | 20 | Mg | 30 | B | 48.8 | — | 0 | Cu | 1.2 | |
| 161 | Ti | 20 | ZA | 20 | Mg | 30 | B | 49.4 | — | 0 | Cu | 0.6 | |
| 162 | Ti | 20 | ZA | 20 | Mg | 30 | B | 49.8 | — | 0 | Cu | 0.2 | |
| 163 | Ti | 20 | ZA | 20 | Mg | 30 | B | 49 | — | 0 | Cr | 1 | |
| 164 | Ti | 20 | ZA | 20 | Mg | 30 | B | 49.5 | — | 0 | Cr | 0.5 | |

<Hot Pressing Process>

After the formation process of the surface treatment layer, the steel sheet of each test number was subjected to hot press heating by two types of heating systems of furnace heating and energization heating, and thus hot pressing was performed. In the furnace heating, the atmosphere in the furnace was set to 910° C. and the air-fuel ratio was set to 1.1, and the steel sheet was taken out of the furnace immediately after the temperature of the steel sheet reached 900° C. In the energization heating, heating was performed at 870° C., with the heating rate set to 85° C./second and 42.5° C./second. In the following, the results of energization heating, which is heating of a shorter time than furnace heating, are shown in Table 3, and the results by furnace heating are shown in Table 4.

After the hot press heating, cooling was performed until the temperature of the steel sheet became 650° C. After the cooling, the steel sheet was sandwiched by a flat sheet mold equipped with a water cooling jacket, and thus a hot pressed steel material (steel sheet) was produced. Cooling was performed up to approximately 360° C., which is the martensite transformation starting point, so as to ensure a cooling rate of 50° C./second or more even in a portion where the cooling rate had been low during the hot pressing, and thus quenching was performed.

<Evaluation Method>

[Phosphate Treatability Evaluation Test]

The sheet-like hot pressed steel material of each of the test numbers described in Table 3 and Table 4 below was subjected to surface conditioning at room temperature for 20 seconds using a surface conditioning treatment agent, Prepalene X (product name) manufactured by Nihon Parkerizing Co., Ltd. Further, phosphate treatment was performed using a zinc phosphate treatment liquid, Palbond 3020 (product name) manufactured by Nihon Parkerizing Co., Ltd. The sheet-like hot pressed steel material was dipped in the treatment liquid for 10 seconds or 30 seconds, while it is normally 120 seconds, with the temperature of the treatment liquid set to 43° C., and then water washing and drying were performed. The reason for making the time for dipping the material in the treatment liquid shorter than the ordinary time for dipping the material in the treatment liquid is to imitate the situation in which attached amount of phosphate treatment to be performed after that on the hot-dip Zn-based plated steel sheet is not sufficient.

Random 5 visual fields (125 µm×90 µm) of the surface of the hot pressed steel material after phosphate treatment were observed with a scanning electron microscope (SEM) at a magnification of 1000 times, and back scattered electron images (BSE images) were obtained. In the back scattered electron image, the observation area was displayed as an image by the gray scale. In the back scattered electron image, the contrast is different between a portion where a phosphate coating film that is a chemical conversion coating film is formed and a portion where a phosphate coating film is not formed. Thus, the numerical range X1 of the lightness (a plurality of levels of gradation) of a portion where a phosphate coating film was not formed was determined in advance by a SEM and an energy dispersive X-ray spectrometer (EDS).

In the back scattered electron image of each visual field, the area A1 of an area showing the contrast of the numerical range X1 was found by image processing. Then, the transparent area ratio TR (%) of each visual field was found on the basis of Formula (1) below.

$$TR=(A1/A0)\times 100 \qquad (1)$$

Here, in Formula (1) above, A0 represents the total area of the visual field (11,250 µm$^2$). The average of the transparent area ratios TR (%) of the 5 visual fields was defined as the transparent area ratio (%) of the hot pressed steel material of the test number.

"M" in the "Phosphate treatability" section in Table 3 and Table 4 means that the transparent area ratio was more than or equal to 30%. "L" means that the transparent area ratio was more than or equal to 25% and less than 30%. "K" means that the transparent area ratio was more than or equal to 20% and less than 25%. "J" means that the transparent area ratio was more than or equal to 15% and less than 20%. "I" means that the transparent area ratio was more than or equal to 13% and less than 15%. "H" means that the transparent area ratio was more than or equal to 11% and less than 13%. "G" means that the transparent area ratio was more than or equal to 10% and less than 11%. "F" means that the transparent area ratio was more than or equal to 8% and less than 10%. "E" means that the transparent area ratio was more than or equal to 6% and less than 8%. "D" means that the transparent area ratio was more than or equal to 5% and less than 6%. "C" means that the transparent area ratio was more than or equal to 2.5% and less than 5%. "B" means that the transparent area ratio was more than or equal to 1% and less than 2.5%. "A" means that the transparent area ratio was less than 1%. The case of "I," "H," "G," "F," "E," "D," "C," "B," or "A" in the transparency evaluation was assessed as excellent in phosphate treatability.

[FF Chemical Conversion Treatability Evaluation Test]

Further, instead of the phosphate treatability, treatment using an aqueous solution containing Zr ions and/or Ti ions, and fluorine and containing 100 to 1000 ppm of free fluoride ions (hereinafter, referred to as FF chemical conversion treatment liquid) was performed.

The FF chemical conversion treatment liquid mentioned above dissolves free fluorine (hereinafter, abbreviated as FF), an Al oxide coating film, and a Zn oxide coating film. Therefore, while dissolving part or the whole of the Al oxide coating film and the Zn oxide coating film, FF etches the Zn-containing layer formed in the hot stamping process. As a result, a chemical conversion treatment layer made of an oxide of Zr and Ti, or a mixture of an oxide and a fluoride of Zr and Ti (hereinafter, referred to as a specific chemical conversion treatment layer) is formed. When the FF concentration is controlled so that the Al oxide coating film and the Zn oxide coating film can be etched, the Al oxide coating film and the Zn oxide coating film are etched, and the specific chemical conversion treatment layer is formed.

To obtain the FF chemical conversion treatment liquid, $H_2ZrF_6$ (hexafluorozirconic acid) and $H_2TiF_6$ (hexafluorotitanic acid) were put in a container so that the metal concentration might be a prescribed value, and were diluted with ion-exchanged water. After that, hydrofluoric acid and a sodium hydroxide aqueous solution were put in the container, and adjustment was made so that the fluorine concentration and the free fluorine concentration in the solution might be prescribed values. The free fluorine concentration was measured using a commercially available concentration measuring device. After the adjustment, the container was adjusted to a fixed volume with ion-exchanged water; thus, an FF chemical conversion treatment liquid was prepared.

Regarding the FF chemical conversion treatment, as pretreatment, dipping degreasing was performed at 45° C. for 2 minutes using an alkaline degreasing agent (EC90, manufactured by Nippon Paint Co., Ltd.). After that, dipping was performed in the FF chemical conversion treatment liquids shown in Table 6 below at 40° C. for 10 seconds or 30 seconds, while it is normally 120 seconds, and thus chemical conversion treatment was performed. After the chemical conversion treatment, the test piece was washed with water and dried. The reason for making the time for dipping the material in the treatment liquid shorter than the ordinary time for dipping the material in the treatment liquid is to imitate the situation in which attached amount of FF chemical conversion treatment to be performed after that on the hot-dip Zn-based plated steel sheet is not sufficient.

To investigate the chemical conversion treatability of the specific chemical conversion treatment layer of the resulting test material, the amount of Zr or Ti attached was measured by fluorescent X-ray analysis; the case where the measurement value of the attached amount was 10 to 100 mg/m² was classified as "A," and the case where the measurement value of the attached amount was less than 10 mg/m² or more than 100 mg/m² was classified as "B"; the obtained results are collectively shown in Table 5. Note that, for a system containing zirconia, the attached amount before performing Zr-based FF treatment was measured by fluorescent X-ray analysis in advance, and the value obtained by subtracting the amount of Zr attached before the chemical conversion treatment from the amount of Zr attached after the treatment was set as the attached amount of FF chemical conversion treatment. The method and the evaluation criterion of the coating adhesiveness evaluation test and the cycle corrosion test performed on the resulting test material are similar to those of the coating adhesiveness evaluation test and the cycle corrosion test performed on the test material on which the phosphate coating film mentioned above was formed. Note that since the present invention exhibits satisfactory adhesiveness even in the case where the chemical conversion treatability is insufficient, the FF chemical conversion treatability is not a necessary property, and a result of a system having low FF chemical conversion treatability in which the FF chemical conversion treatability is "B", which is a gist of the present invention, is also shown as an index exhibiting satisfactory adhesiveness.

[Coating Adhesiveness Evaluation Test]

After the phosphate treatment or the FF chemical conversion treatment described above was performed, the sheet-like hot pressed steel material of each test number was coated with a cationic electrodeposition coating material manufactured by Nippon Paint Co., Ltd. by electrodeposition with slope energization at a voltage of 160 V, and baking coating was performed at a baking temperature of 170° C. for 20 minutes. The average of film thicknesses of the coating material after electrodeposition coating was 10 μm in all the test numbers.

After the electrodeposition coating, the hot pressed steel material was dipped in a 5% NaCl aqueous solution having a temperature of 50° C. for 500 hours. After the dipping, a polyester tape was adhered to the whole of an area of 60 mm×120 mm (area A10=60 mm×120 mm=7200 mm²) of the test surface. After that, the tape was ripped off. The area A2 (mm²) of the coating film peeled off by the ripping-off of the tape was found, and the rate of coating peeling (%) was found on the basis of Formula (2).

$$\text{Rate of coating peeling} = (A2/A10) \times 100 \tag{2}$$

"M" of the "Coating film adhesiveness" section in Tables 3 to 5 means that the rate of coating peeling was more than or equal to 50.0%. "L" means that the rate of coating peeling was more than or equal to 35% and less than 50%. "K" means that the rate of coating peeling was more than or equal to 20% and less than 35%. "J" means that the rate of coating peeling was more than or equal to 10% and less than 20%. "I" means that the rate of coating peeling was more than or equal to 8% and less than 10%. "H" means that the rate of coating peeling was more than or equal to 6% and less than 8%. "G" means that the rate of coating peeling was more than or equal to 5% and less than 6%. "F" means that the rate of coating peeling was more than or equal to 4% and less than 5%. "E" means that the rate of coating peeling was more than or equal to 3% and less than 4%. "D" means that the rate of coating peeling was more than or equal to 2.5% and less than 3%. "C" means that the rate of coating peeling was more than or equal to 1.3% and less than 2.5%. "B" means that the rate of coating peeling was more than or equal to 0.5% and less than 1.3%. "A" means that the rate of coating peeling was less than 0.5%. The case of "I," "H,"

"G," "F," "E," "D," "C," "B," or "A" in the coating adhesiveness evaluation was assessed as excellent in coating adhesiveness.

[Cycle Corrosion Test]

A gap was provided to the coating of the evaluation surface with a cutter (load: 500 gf; 1 gf being approximately $9.8 \times 10^{-3}$ N), and a cycle corrosion test of the following cycle conditions was performed 180 cycles.

Cycle Conditions

A cycle corrosion test was performed in which a procedure of two hours of salt water spraying (SST; 5% NaCl; atmosphere: 35° C.), then two hours of drying (60° C.), and then four hours of wetting (50° C.; RH: 98%) was taken as one cycle.

After that, the presence or absence of a blister of the coating film occurring in an area of an approximately 1 cm width from the cut portion was observed.

"E" of the "Corrosion resistance" section in Tables 3 to 5 means that a coating blister of more than or equal to 3.0 mm occurred. "D" means that a coating blister of more than or equal to 2.0 mm and less than 3.0 mm occurred. "C" means that a coating blister of more than or equal to 1.0 mm and less than 2.0 mm occurred. "B" means that a minute coating blister of more than or equal to 0.5 mm and less than 1 mm occurred. "A" means that a very minute coating blister of less than 0.5 mm occurred. The case of "C," "B," or "A" in the cycle corrosion test was assessed as excellent in corrosion resistance.

TABLE 3

| No | Steel type | Zn-based plating layer Type | Al concentration (mass %) | Surface treatment layer Type | Attached amount (g/m$^2$) | Oxide A (g/m$^2$) | Oxide B (g/m$^2$) | Oxide C (g/m$^2$) | Chemical conversion treatment Type of chemical conversion treatment | Treatment time (sec) | Treatability | Coating adhesiveness | Corrosion resistance | Notes |
|---|---|---|---|---|---|---|---|---|---|---|---|---|---|---|
| 1 | #1 | GA | 0.2 | 1 | 1 | 1 | 0 | 0 | Phosphoric acid | 30 | J | D | A | |
| 2 | #1 | GA | 0.2 | 2 | 1 | 0.75 | 0 | 0 | Phosphoric acid | 30 | J | D | A | |
| 3 | #1 | GA | 0.2 | 3 | 1 | 0.4 | 0 | 0 | Phosphoric acid | 30 | J | D | A | |
| 4 | #1 | GA | 0.2 | 4 | 1 | 0.2 | 0 | 0 | Phosphoric acid | 30 | J | G | A | |
| 5 | #1 | GA | 0.2 | 5 | 1 | 0.5 | 0 | 0 | Phosphoric acid | 30 | J | D | A | |
| 6 | #1 | GA | 0.2 | 6 | 1 | 0.5 | 0 | 0 | Phosphoric acid | 30 | J | D | A | |
| 7 | #1 | GA | 0.2 | 7 | 1 | 0.5 | 0 | 0 | Phosphoric acid | 30 | J | D | A | Si: 0.006 g/m$^2$ |
| 8 | #1 | GA | 0.2 | 8 | 1 | 0.5 | 0 | 0 | Phosphoric acid | 30 | J | D | A | |
| 9 | #1 | GA | 0.2 | 9 | 1 | 0.5 | 0 | 0 | Phosphoric acid | 30 | J | D | A | |
| 10 | #1 | GA | 0.2 | 10 | 1 | 0.5 | 0 | 0 | Phosphoric acid | 30 | J | D | A | P: 0.029 g/m$^2$, Al: 0.008 g/m$^2$ |
| 11 | #1 | GA | 0.2 | 11 | 1 | 0.5 | 0 | 0 | Phosphoric acid | 30 | J | D | A | Si: 0.047 g/m$^2$ |
| 12 | #1 | GA | 0.2 | 12 | 1 | 1 | 0 | 0 | Phosphoric acid | 30 | J | D | A | |
| 13 | #1 | GA | 0.2 | 13 | 1 | 0.5 | 0 | 0 | Phosphoric acid | 30 | J | D | A | |
| 14 | #1 | GA | 0.2 | 14 | 1 | 1 | 0 | 0 | Phosphoric acid | 30 | J | J | C | Comparative Example |
| 15 | #1 | GA | 0.2 | 15 | 1 | 0.5 | 0 | 0 | Phosphoric acid | 30 | J | J | C | Comparative Example |
| 16 | #1 | GA | 0.2 | 16 | 1 | 0.5 | 0 | 0 | Phosphoric acid | 30 | J | D | C | |
| 17 | #1 | GA | 0.2 | 17 | 1 | 0.5 | 0 | 0 | Phosphoric acid | 30 | J | D | C | |
| 18 | #1 | GA | 0.2 | 18 | 1 | 0.5 | 0 | 0 | Phosphoric acid | 30 | J | D | C | |
| 19 | #1 | GA | 0.2 | 19 | 1 | 0.5 | 0 | 0 | Phosphoric acid | 30 | J | M | D | Comparative Example |
| 20 | #1 | GA | 0.2 | 20 | 1 | 0.5 | 0 | 0 | Phosphoric acid | 30 | J | D | B | |
| 21 | #1 | GA | 0.2 | 21 | 1 | 0.5 | 0 | 0 | Phosphoric acid | 30 | J | D | B | P: 0.029 g/m$^2$, Al: 0.008 g/m$^2$ |
| 22 | #1 | GA | 0.2 | 22 | 1 | 0.5 | 0 | 0 | Phosphoric acid | 30 | J | D | B | |
| 23 | #1 | GA | 0.2 | 23 | 1 | 0.5 | 0 | 0 | Phosphoric acid | 30 | J | D | B | P: 0.029 g/m$^2$, Al: 0.008 g/m$^2$ |
| 24 | #1 | GA | 0.2 | 24 | 1 | 0.5 | 0 | 0 | Phosphoric acid | 30 | J | D | B | |
| 25 | #1 | GA | 0.2 | 25 | 1 | 0.5 | 0 | 0 | Phosphoric acid | 30 | J | D | B | P: 0.029 g/m$^2$, Al: 0.008 g/m$^2$ |
| 26 | #1 | GA | 0.2 | 26 | 1 | 0.6 | 0 | 0 | Phosphoric acid | 30 | J | D | B | |
| 27 | #1 | GA | 0.2 | 27 | 1 | 0.6 | 0 | 0 | Phosphoric acid | 30 | J | D | B | |
| 28 | #1 | GA | 0.2 | 28 | 1 | 0.6 | 0 | 0 | Phosphoric acid | 30 | J | D | C | |
| 29 | #1 | GA | 0.2 | 29 | 1 | 1 | 0 | 0 | Phosphoric acid | 30 | M | M | E | Comparative Example |
| 30 | #1 | GA | 0.2 | 30 | 1 | 0.5 | 0 | 0 | Phosphoric acid | 30 | M | M | E | Comparative Example |
| 31 | #1 | GA | 0.2 | 31 | 1 | 0 | 0 | 0 | Phosphoric acid | 30 | J | M | E | Comparative Example |
| 32 | #1 | GA | 0.2 | 32 | 1 | 0 | 0 | 0 | Phosphoric acid | 30 | J | M | E | Comparative Example |
| 33 | #2 | GA | 0.2 | 5 | 1 | 0.5 | 0 | 0 | Phosphoric acid | 30 | J | D | A | |
| 34 | #3 | GA | 0.2 | 5 | 1 | 0.5 | 0 | 0 | Phosphoric acid | 30 | J | D | A | |
| 35 | #4 | GA | 0.2 | 5 | 1 | 0.5 | 0 | 0 | Phosphoric acid | 30 | J | D | A | |
| 36 | #5 | GA | 0.2 | 5 | 1 | 0.5 | 0 | 0 | Phosphoric acid | 30 | J | D | A | |
| 37 | #6 | GA | 0.2 | 5 | 1 | 0.5 | 0 | 0 | Phosphoric acid | 30 | J | D | A | |
| 38 | #1 | GI | 0.4 | 5 | 1 | 0.5 | 0 | 0 | Phosphoric acid | 30 | J | D | A | |
| 39 | #1 | A1 | 55 | 5 | 1 | 0.5 | 0 | 0 | Phosphoric acid | 30 | J | D | A | |
| 40 | #1 | A2 | 6 | 5 | 1 | 0.5 | 0 | 0 | Phosphoric acid | 30 | J | D | A | |
| 41 | #1 | A3 | 11 | 5 | 1 | 0.5 | 0 | 0 | Phosphoric acid | 30 | J | D | A | |
| 42 | #1 | GA | 0.2 | 5 | 0.2 | 0.1 | 0 | 0 | Phosphoric acid | 30 | J | J | D | Comparative Example |
| 43 | #1 | GA | 0.2 | 5 | 0.5 | 0.25 | 0 | 0 | Phosphoric acid | 30 | J | G | C | |
| 44 | #1 | GA | 0.2 | 5 | 2 | 1 | 0 | 0 | Phosphoric acid | 30 | J | D | A | |
| 45 | #1 | GA | 0.2 | 5 | 3 | 1.5 | 0 | 0 | Phosphoric acid | 30 | J | D | A | |
| 46 | #1 | GA | 0.2 | 5 | 4 | 2 | 0 | 0 | Phosphoric acid | 30 | J | G | A | |

TABLE 3-continued

| | | Zn-based plating layer | | | Surface treatment layer | | | | Chemical conversion treatment | | | | | |
|---|---|---|---|---|---|---|---|---|---|---|---|---|---|---|
| No | Steel type | Type | Al concentration (mass %) | Type | Attached amount (g/m²) | Oxide A (g/m²) | Oxide B (g/m²) | Oxide C (g/m²) | Type of chemical conversion treatment | Treatment time (sec) | Treatability | Coating adhesiveness | Corrosion resistance | Notes |
| 47 | #1 | GA | 0.2 | 5 | 6 | 3 | 0 | 0 | Phosphoric acid | 30 | J | J | A | Comparative Example |
| 48 | #1 | GA | 0.2 | 33 | 2 | 0.5 | 0.5 | 0 | Phosphoric acid | 30 | D | A | A | Si: 0.006 g/m², P: 0.029 g/m², Al: 0.008 g/m² |
| 49 | #1 | GA | 0.2 | 34 | 2 | 0.5 | 0.5 | 0 | Phosphoric acid | 30 | D | A | A | Si: 0.053 g/m² |
| 50 | #1 | GA | 0.2 | 35 | 2 | 0.5 | 0.5 | 0 | Phosphoric acid | 30 | D | A | A | P: 0.029 g/m², Al: 0.008 g/m² |
| 51 | #1 | GA | 0.2 | 36 | 2 | 0.5 | 0.5 | 0 | Phosphoric acid | 30 | D | A | A | Si: 0.047 g/m² |
| 52 | #1 | GA | 0.2 | 37 | 2 | 0.6 | 0.6 | 0 | Phosphoric acid | 30 | D | A | A | |
| 53 | #1 | GA | 0.2 | 38 | 2 | 0.6 | 0.6 | 0 | Phosphoric acid | 30 | D | A | A | |
| 54 | #1 | GA | 0.2 | 39 | 2 | 0.6 | 0.6 | 0 | Phosphoric acid | 30 | G | D | B | |
| 55 | #1 | GA | 0.2 | 40 | 2 | 0.6 | 0.6 | 0 | Phosphoric acid | 30 | G | D | B | |
| 56 | #1 | GA | 0.2 | 41 | 2 | 0.4 | 1 | 0 | Phosphoric acid | 30 | D | A | A | |
| 57 | #1 | GA | 0.2 | 42 | 2 | 0.2 | 1 | 0 | Phosphoric acid | 30 | D | A | A | |
| 58 | #1 | GA | 0.2 | 43 | 2 | 0.1 | 0.1 | 0 | Phosphoric acid | 30 | J | J | C | Comparative Example |
| 59 | #1 | GA | 0.2 | 44 | 2 | 0.6 | 1 | 0 | Phosphoric acid | 30 | D | A | A | |
| 60 | #1 | GA | 0.2 | 45 | 2 | 0.6 | 0.6 | 0 | Phosphoric acid | 30 | D | A | B | |
| 61 | #1 | GA | 0.2 | 46 | 2 | 0.6 | 0.6 | 0 | Phosphoric acid | 30 | D | A | B | |
| 62 | #1 | GA | 0.2 | 47 | 2 | 0.4 | 0 | 0.6 | Phosphoric acid | 30 | D | D | A | Si: 0.006 g/m², P: 0.029 g/m², Al: 0.008 g/m² |
| 63 | #1 | GA | 0.2 | 48 | 2 | 0.4 | 0 | 0.6 | Phosphoric acid | 30 | D | D | A | Si: 0.053 g/m² |
| 64 | #1 | GA | 0.2 | 49 | 2 | 0.4 | 0 | 0.6 | Phosphoric acid | 30 | D | D | A | P: 0.029 g/m², Al: 0.008 g/m² |
| 65 | #1 | GA | 0.2 | 50 | 2 | 0.4 | 0 | 0.6 | Phosphoric acid | 30 | D | D | A | Si: 0.047 g/m² |
| 66 | #1 | GA | 0.2 | 51 | 2 | 0.5 | 0 | 0.7 | Phosphoric acid | 30 | D | D | A | |
| 67 | #1 | GA | 0.2 | 52 | 2 | 0.5 | 0 | 0.7 | Phosphoric acid | 30 | D | G | C | |
| 68 | #1 | GA | 0.2 | 53 | 2 | 0.4 | 0 | 0.6 | Phosphoric acid | 30 | D | G | C | Si: 0.006 g/m², P: 0.029 g/m², Al: 0.008 g/m² |
| 69 | #1 | GA | 0.2 | 54 | 2 | 0.4 | 0 | 0.6 | Phosphoric acid | 30 | D | G | C | Si: 0.053 g/m² |
| 70 | #1 | GA | 0.2 | 55 | 2 | 0.5 | 0 | 0.7 | Phosphoric acid | 30 | D | G | C | |
| 71 | #1 | GA | 0.2 | 56 | 2 | 0.4 | 0 | 0.6 | Phosphoric acid | 30 | D | G | C | Si: 0006 g/m², P: 0.029 g/m², Al: 0.008 g/m² |
| 72 | #1 | GA | 0.2 | 57 | 2 | 1 | 0 | 0.4 | Phosphoric acid | 30 | D | G | C | |
| 73 | #1 | GA | 0.2 | 58 | 2 | 0.4 | 0 | 0.6 | Phosphoric acid | 30 | D | G | C | Si: 0.006 g/m², P: 0.029 g/m², Al: 0.008 g/m² |
| 74 | #1 | GA | 0.2 | 59 | 2 | 0.1 | 0 | 0 | Phosphoric acid | 30 | J | J | C | |
| 75 | #1 | GA | 0.2 | 60 | 2 | 1 | 0 | 0.6 | Phosphoric acid | 30 | D | D | A | |
| 76 | #1 | GA | 0.2 | 61 | 3 | 0.6 | 0.6 | 0.9 | Phosphoric acid | 30 | A | A | B | |
| 77 | #1 | GA | 0.2 | 62 | 3 | 0.6 | 0.6 | 0.9 | Phosphoric acid | 30 | A | A | A | |
| 78 | #1 | GA | 0.2 | 63 | 3 | 0.6 | 0.6 | 0.9 | Phosphoric acid | 30 | A | A | B | |
| 79 | #1 | GA | 0.2 | 64 | 3 | 0.6 | 0.6 | 0.9 | Phosphoric acid | 30 | A | A | B | |
| 80 | #1 | GA | 0.2 | 65 | 3 | 0.6 | 0.6 | 0.9 | Phosphoric acid | 30 | A | A | B | |
| 81 | #1 | GA | 0.2 | 66 | 3 | 0.6 | 0.6 | 0.9 | Phosphoric acid | 30 | A | A | A | |
| 82 | #1 | GA | 0.2 | 67 | 3 | 0.6 | 0.6 | 0.9 | Phosphoric acid | 30 | A | A | A | Si: 0.006g/m², P: 0.015 g/m², Al: 0.004 g/m² |
| 83 | #1 | GA | 0.2 | 68 | 3 | 0.6 | 0.6 | 0.9 | Phosphoric acid | 30 | A | A | A | Si: 0.029 g/m² |
| 84 | #1 | GA | 0.2 | 69 | 3 | 0.6 | 0.6 | 0.9 | Phosphoric acid | 30 | A | A | A | P: 0.015 g/m², Al: 0.004 g/m² |
| 85 | #1 | GA | 0.2 | 70 | 3 | 0.6 | 0.6 | 0.9 | Phosphoric acid | 30 | A | A | A | Si: 0.023 g/m² |
| 86 | #1 | GA | 0.2 | 71 | 3 | 0.6 | 0.6 | 0.9 | Phosphoric acid | 30 | A | A | A | Si: 0.006 g/m², P: 0.015 g/m², Al: 0.004 g/m² |
| 87 | #1 | GA | 0.2 | 72 | 3 | 0.6 | 0.6 | 0.9 | Phosphoric acid | 30 | A | A | A | Si: 0.029 g/m² |
| 88 | #1 | GA | 0.2 | 73 | 3 | 0.6 | 0.6 | 0.9 | Phosphoric acid | 30 | A | A | A | P: 0.015 g/m², Al :0.004 g/m² |
| 89 | #1 | GA | 0.2 | 74 | 3 | 0.6 | 0.6 | 0.9 | Phosphoric acid | 30 | A | A | A | Si: 0.023 g/m² |
| 90 | #1 | GA | 0.2 | 37 | 0.5 | 0.15 | 0.15 | 0 | Phosphoric acid | 30 | J | J | D | Comparative Example |
| 91 | #1 | GA | 0.2 | 37 | 1 | 0.3 | 0.3 | 0 | Phosphoric acid | 30 | G | D | B | |
| 92 | #1 | GA | 0.2 | 37 | 5 | 1.0 | 1.5 | 0 | Phosphoric acid | 30 | D | A | A | |
| 93 | #1 | GA | 0.2 | 37 | 6 | 1.8 | 1.8 | 0 | Phosphoric acid | 30 | D | A | A | |
| 94 | #1 | GA | 0.2 | 51 | 0.5 | 0.125 | 0 | 0.175 | Phosphoric acid | 30 | D | J | D | Comparative Example |
| 95 | #1 | GA | 0.2 | 51 | 0.25 | 0 | 0.35 | | Phosphoric acid | 30 | G | G | C | |
| 96 | #1 | GA | 0.2 | 51 | 1 | 4 | 0 | 1.4 | Phosphoric acid | 30 | D | A | B | |

TABLE 3-continued

| | | Zn-based plating layer | | | Surface treatment layer | | | | Chemical conversion treatment | | | | | |
|---|---|---|---|---|---|---|---|---|---|---|---|---|---|---|
| No | Steel type | Type | Al concentration (mass %) | Type | Attached amount (g/m²) | Oxide A (g/m²) | Oxide B (g/m²) | Oxide C (g/m²) | Type of chemical conversion treatment | Treatment time (sec) | Treatability | Coating adhesiveness | Corrosion resistance | Notes |
| 97 | #1 | GA | 0.2 | 51 | 5 | 2 | 0 | 2.8 | Phosphoric acid | 30 | D | A | B | |
| 98 | #2 | GA | 0.2 | 37 | 2 | 0.6 | 0.6 | 0 | Phosphoric acid | 30 | D | A | A | |
| 99 | #3 | GA | 0.2 | 37 | 2 | 0.6 | 0.6 | 0 | Phosphoric acid | 30 | D | A | A | |
| 100 | #4 | GA | 0.2 | 37 | 2 | 0.6 | 0.6 | 0 | Phosphoric acid | 30 | D | A | A | |
| 101 | #5 | GA | 0.2 | 37 | 2 | 0.6 | 0.6 | 0 | Phosphoric acid | 30 | D | A | A | |
| 102 | #6 | GA | 0.2 | 37 | 2 | 0.6 | 0.6 | 0 | Phosphoric acid | 30 | D | A | A | |
| 103 | #1 | GI | 0.4 | 37 | 2 | 0.6 | 0.6 | 0 | Phosphoric acid | 30 | G | D | A | |
| 104 | #1 | A1 | 55 | 37 | 2 | 0.6 | 0.6 | 0 | Phosphoric acid | 30 | D | A | A | |
| 105 | #1 | A2 | 6 | 37 | 2 | 0.6 | 0.6 | 0 | Phosphoric acid | 30 | D | A | A | |
| 106 | #1 | A3 | 11 | 37 | 2 | 0.6 | 0.6 | 0 | Phosphoric acid | 30 | G | D | A | |
| 107 | #2 | GA | 0.2 | 51 | 2 | 0.5 | 0 | 0.7 | Phosphoric acid | 30 | D | D | B | |
| 108 | #3 | GA | 0.2 | 51 | 2 | 0.5 | 0 | 0.7 | Phosphoric acid | 30 | D | D | B | |
| 109 | #4 | GA | 0.2 | 51 | 2 | 0.5 | 0 | 0.7 | Phosphoric acid | 30 | D | D | B | |
| 110 | #5 | GA | 0.2 | 51 | 2 | 0.5 | 0 | 0.7 | Phosphoric acid | 30 | D | D | B | |
| 111 | #6 | GA | 0.2 | 51 | 2 | 0.5 | 0 | 0.7 | Phosphoric acid | 30 | D | D | B | |
| 112 | #1 | GI | 0.4 | 51 | 2 | 0.5 | 0 | 0.7 | Phosphoric acid | 30 | D | D | B | |
| 113 | #1 | A1 | 55 | 51 | 2 | 0.5 | 0 | 0.7 | Phosphoric acid | 30 | D | D | B | |
| 114 | #1 | A2 | 6 | 51 | 2 | 0.5 | 0 | 0.7 | Phosphoric acid | 30 | D | D | B | |
| 115 | #1 | A3 | 6 | 51 | 2 | 0.5 | 0 | 0.7 | Phosphoric acid | 30 | D | D | B | |
| 116 | #1 | GA | 0.2 | 61 | 3 | 0.6 | 0.6 | 0.9 | Phosphoric acid | 30 | A | A | A | |
| 117 | #1 | GA | 0.2 | 61 | 2 | 0.4 | 0.4 | 0.6 | Phosphoric acid | 30 | A | A | A | |
| 118 | #1 | GA | 0.2 | 61 | 5 | 1 | 1 | 1.5 | Phosphoric acid | 30 | A | A | A | |
| 119 | #1 | GA | 0.2 | 61 | 7 | 1.4 | 1.4 | 2.1 | Phosphoric acid | 30 | A | A | A | |
| 120 | #1 | GA | 0.2 | 61 | 9 | 1.8 | 1.8 | 2.7 | Phosphoric acid | 30 | A | A | A | |
| 121 | #1 | GA | 0.2 | 61 | 1 | 0.2 | 0.2 | 0.3 | Phosphoric acid | 30 | D | D | B | |
| 122 | #1 | GA | 0.2 | 61 | 0.5 | 0.1 | 0.1 | 0.15 | Phosphoric acid | 30 | G | J | C | Comparative Example |
| 123 | #4 | GA | 0.2 | 61 | 3 | 0.6 | 0.6 | 0.9 | Phosphoric acid | 30 | A | A | A | |
| 124 | #5 | GA | 0.2 | 61 | 3 | 0.6 | 0.6 | 0.9 | Phosphoric acid | 30 | A | A | A | |
| 125 | #6 | GA | 0.2 | 61 | 3 | 0.6 | 0.6 | 0.9 | Phosphoric acid | 30 | A | A | A | |
| 126 | #7 | GA | 0.2 | 61 | 3 | 0.6 | 0.6 | 0.9 | Phosphoric acid | 30 | A | A | A | Mn + Cr 0.4% |
| 127 | #8 | GA | 0.2 | 61 | 3 | 0.6 | 0.6 | 0.9 | Phosphoric acid | 30 | A | A | A | Mn + Cr 0.6% |
| 128 | #1 | GI | 0.4 | 61 | 3 | 0.6 | 0.6 | 0.9 | Phosphoric acid | 30 | A | A | A | |
| 129 | #1 | A1 | 55 | 61 | 3 | 0.6 | 0.6 | 0.9 | Phosphoric acid | 30 | A | A | A | |
| 130 | #1 | A2 | 6 | 61 | 3 | 0.6 | 0.6 | 0.6 | Phosphoric acid | 30 | A | A | A | |
| 131 | #1 | A3 | 11 | 61 | 3 | 0.6 | 0.6 | 0.9 | Phosphoric acid | 30 | A | A | A | |
| 132 | #1 | A4 | 0 | 61 | 3 | 0.6 | 0.6 | 0.9 | Phosphoric acid | 30 | A | A | A | |
| 133 | #1 | A5 | 0 | 61 | 3 | 0.6 | 0.6 | 0.9 | Phosphoric acid | 30 | A | A | A | |
| 134 | #1 | A6 | 0 | 61 | 3 | 0.6 | 0.6 | 0.9 | Phosphoric acid | 30 | A | A | A | |
| 135 | #1 | A4 | 0 | 61 | 3 | 0.6 | 0.6 | 0.9 | Phosphoric acid | 30 | A | A | A | |
| 136 | #1 | A5 | 0 | 61 | 3 | 0.6 | 0.6 | 0.9 | Phosphoric acid | 30 | A | A | A | |
| 137 | #1 | A6 | 0 | 61 | 3 | 0.6 | 0.6 | 0.9 | Phosphoric acid | 30 | A | A | A | |
| 138 | #1 | GA | 0.2 | 75 | 2 | 0.5 | 0 | 0.7 | Phosphoric acid | 30 | D | D | A | |
| 139 | #1 | GA | 0.2 | 76 | 2 | 0.5 | 0 | 0.7 | Phosphoric acid | 30 | D | D | A | |
| 140 | #1 | GA | 0.2 | 77 | 3 | 0.6 | 0.6 | 0.9 | Phosphoric acid | 30 | A | A | B | |
| 141 | #1 | GA | 0.2 | 78 | 3 | 0.6 | 0.6 | 0.9 | Phosphoric acid | 30 | A | A | A | |
| 142 | #1 | GA | 0.2 | 79 | 3 | 0.6 | 0.6 | 0.9 | Phosphoric acid | 30 | A | A | A | |
| 143 | #1 | GA | 0.2 | 80 | 3 | 0.6 | 0.6 | 0.9 | Phosphoric acid | 30 | A | A | B | |
| 144 | #1 | GA | 0.2 | 81 | 3 | 0.6 | 0.6 | 0.9 | Phosphoric acid | 30 | A | A | B | |
| 145 | #1 | GA | 0.2 | 82 | 3 | 0.6 | 0.6 | 0.9 | Phosphoric acid | 30 | A | A | B | |
| 146 | #1 | GA | 0.2 | 5 | 1 | 0.5 | 0 | 0 | Phosphoric acid | 10 | M | G | A | |
| 147 | #1 | GA | 0.2 | 83 | 2 | 0.6 | 0.6 | 0 | Phosphoric acid | 30 | D | A | A | |
| 148 | #1 | GA | 0.2 | 84 | 2 | 0.6 | 0.6 | 0 | Phosphoric acid | 30 | D | A | A | |
| 149 | #1 | GA | 0.2 | 85 | 2 | 0.6 | 0.6 | 0 | Phosphoric acid | 30 | D | A | A | |
| 150 | #1 | GA | 0.2 | 86 | 2 | 0.6 | 0.6 | 0 | Phosphoric acid | 30 | D | A | B | |
| 151 | #1 | GA | 0.2 | 87 | 2 | 0.6 | 0.6 | 0 | Phosphoric acid | 30 | D | A | A | |
| 152 | #1 | GA | 0.2 | 88 | 2 | 0.6 | 0.6 | 0 | Phosphoric acid | 30 | D | A | A | |
| 153 | #1 | GA | 0.2 | 89 | 2 | 0.6 | 0.6 | 0 | Phosphoric acid | 30 | D | A | A | |
| 154 | #1 | GA | 0.2 | 90 | 2 | 0.6 | 0.6 | 0 | Phosphoric acid | 30 | D | A | B | |
| 155 | #1 | GA | 0.2 | 91 | 2 | 0.6 | 0.6 | 0 | Phosphoric acid | 30 | D | A | A | |
| 156 | #1 | GA | 0.2 | 92 | 2 | 0.6 | 0.6 | 0 | Phosphoric acid | 30 | D | A | A | |
| 157 | #1 | GA | 0.2 | 93 | 2 | 0.6 | 0.6 | 0 | Phosphoric acid | 30 | D | A | A | |
| 158 | #1 | GA | 0.2 | 94 | 2 | 0.6 | 0.6 | 0 | Phosphoric acid | 30 | D | A | B | |
| 159 | #1 | GA | 0.2 | 95 | 3 | 0.6 | 0.6 | 0.9 | Phosphoric acid | 30 | A | A | A | |
| 160 | #1 | GA | 0.2 | 96 | 3 | 0.6 | 0.6 | 0.9 | Phosphoric acid | 30 | A | A | A | |

TABLE 4

| No | Steel type | Zn-based plating layer Type | Al concentration (mass %) | Surface treatment layer Type | Attached amount (g/m²) | Oxide A (g/m²) | Oxide B (g/m²) | Oxide C (g/m²) | Chemical conversion treatment Type of chemical conversion treatment | Treatment time (sec) | Treatability | Coating adhesiveness | Corrosion resistance | Notes |
|---|---|---|---|---|---|---|---|---|---|---|---|---|---|---|
| 161 | #1 | GA | 0.2 | 5 | 1.0 | 0.5 | 0 | 0 | Phosphoric acid | 30 | G | D | A | |
| 162 | #1 | GA | 0.2 | 5 | 2.0 | 1.0 | 0 | 0 | Phosphoric acid | 30 | G | D | A | |
| 163 | #1 | GA | 0.2 | 5 | 4.0 | 2.0 | 0 | 0 | Phosphoric acid | 30 | G | D | A | |
| 164 | #1 | GI | 0.4 | 5 | 2.0 | 1.0 | 0 | 0 | Phosphoric acid | 30 | G | D | A | |
| 165 | #1 | A1 | 55 | 5 | 2.0 | 1.0 | 0 | 0 | Phosphoric acid | 30 | G | D | A | |
| 166 | #1 | A2 | 6 | 5 | 2.0 | 1.0 | 0 | 0 | Phosphoric acid | 30 | G | D | A | |
| 167 | #1 | A3 | 11 | 5 | 2.0 | 1.0 | 0 | 0 | Phosphoric acid | 30 | G | D | A | |
| 168 | #1 | A4 | 0 | 5 | 2.0 | 1.0 | 0 | 0 | Phosphoric acid | 30 | G | D | A | |
| 169 | #1 | A5 | 0 | 5 | 2.0 | 1.0 | 0 | 0 | Phosphoric acid | 30 | G | D | A | |
| 170 | #1 | A6 | 0 | 5 | 2.0 | 1.0 | 0 | 0 | Phosphoric acid | 30 | G | D | A | |
| 171 | #1 | GA | 0.2 | 61 | 1.0 | 0.5 | 0 | 0 | Phosphoric acid | 30 | A | A | A | |
| 172 | #1 | GA | 0.2 | 61 | 2.0 | 1.0 | 0 | 0 | Phosphoric acid | 30 | A | A | A | |
| 173 | #1 | GA | 0.2 | 61 | 4.0 | 2.0 | 0 | 0 | Phosphoric acid | 30 | A | A | A | |
| 174 | #1 | GI | 0.4 | 5 | 2.0 | 1.0 | 0 | 0 | Phosphoric acid | 30 | D | A | A | |
| 175 | #1 | A1 | 55 | 61 | 2.0 | 1.0 | 0 | 0 | Phosphoric acid | 30 | D | A | A | |
| 176 | #1 | A2 | 6 | 61 | 2.0 | 1.0 | 0 | 0 | Phosphoric acid | 30 | A | A | A | |
| 177 | #1 | A3 | 11 | 61 | 2.0 | 1.0 | 0 | 0 | Phosphoric acid | 30 | D | A | A | |
| 178 | #1 | A4 | 0 | 61 | 2.0 | 1.0 | 0 | 0 | Phosphoric acid | 30 | A | A | A | |
| 179 | #1 | A5 | 0 | 61 | 2.0 | 1.0 | 0 | 0 | Phosphoric acid | 30 | A | A | A | |
| 180 | #1 | A6 | 0 | 61 | 2.0 | 1.0 | 0 | 0 | Phosphoric acid | 30 | A | A | A | |

TABLE 5

| No | Steel type | Zn-based plating layer Type | Al concentration (mass %) | Surface treatment coating film Type | Attached amount (g/m²) | Oxide A (g/m²) | Oxide B (g/m²) | Oxide C (g/m²) | FF treatment Type | Treatment time (sec) | FF treatability | Hot pressing process Energization heating Coating adhesiveness | Corrosion resistance | Notes |
|---|---|---|---|---|---|---|---|---|---|---|---|---|---|---|
| 181 | #1 | GA | 0.2 | 5 | 1.0 | 0.5 | 0 | 0 | Zr | 30 | B | D | A | |
| 182 | #1 | GA | 0.2 | 5 | 2.0 | 1.0 | 0 | 0 | Zr | 30 | B | D | A | |
| 183 | #1 | GA | 0.2 | 5 | 4.0 | 2.0 | 0 | 0 | Zr | 30 | B | D | A | |
| 184 | #1 | GI | 0.4 | 5 | 4.0 | 2.0 | 0 | 0 | Zr | 30 | B | D | A | |
| 185 | #1 | A1 | 55 | 5 | 2.0 | 1.0 | 0 | 0 | Zr | 30 | B | D | A | |
| 186 | #1 | A2 | 6 | 5 | 2.0 | 1.0 | 0 | 0 | Zr | 30 | B | D | A | |
| 187 | #1 | A3 | 11 | 5 | 2.0 | 1.0 | 0 | 0 | Zr | 30 | B | D | A | |
| 188 | #1 | A4 | 0 | 5 | 2.0 | 1.0 | 0 | 0 | Zr | 30 | B | D | A | |
| 189 | #1 | A5 | 0 | 5 | 2.0 | 1.0 | 0 | 0 | Zr | 30 | B | D | A | |
| 190 | #1 | A6 | 0 | 5 | 2.0 | 1.0 | 0 | 0 | Zr | 30 | B | D | A | |
| 191 | #1 | GA | 0.2 | 5 | 1.0 | 0.5 | 0 | 0 | Ti | 30 | B | D | A | |
| 192 | #1 | GA | 0.2 | 5 | 2.0 | 1.0 | 0 | 0 | Ti | 30 | B | D | A | |
| 193 | #1 | GA | 0.2 | 5 | 4.0 | 2.0 | 0 | 0 | Ti | 30 | B | D | A | |
| 194 | #1 | GI | 0.4 | 5 | 4.0 | 2.0 | 0 | 0 | Ti | 30 | B | D | A | |
| 195 | #1 | A1 | 55 | 5 | 2.0 | 1.0 | 0 | 0 | Ti | 30 | B | D | A | |
| 196 | #1 | A2 | 6 | 5 | 2.0 | 1.0 | 0 | 0 | Ti | 30 | B | D | A | |
| 197 | #1 | A3 | 11 | 5 | 2.0 | 1.0 | 0 | 0 | Ti | 30 | B | D | A | |
| 198 | #1 | A4 | 0 | 5 | 2.0 | 1.0 | 0 | 0 | Ti | 30 | B | D | A | |
| 199 | #1 | A5 | 0 | 5 | 2.0 | 1.0 | 0 | 0 | Ti | 30 | B | D | A | |
| 200 | #1 | A6 | 0 | 5 | 2.0 | 1.0 | 0 | 0 | Ti | 30 | B | D | A | |
| 201 | #1 | GA | 0.2 | 5 | 4.0 | 2.0 | 0 | 0 | Zr | 30 | A | A | A | |
| 202 | #1 | GI | 0.4 | 5 | 4.0 | 2.0 | 0 | 0 | Zr | 30 | A | A | A | |
| 203 | #1 | A1 | 55 | 5 | 2.0 | 1.0 | 0 | 0 | Zr | 30 | A | A | A | |
| 204 | #1 | A2 | 6 | 5 | 2.0 | 1.0 | 0 | 0 | Zr | 30 | A | A | A | |
| 205 | #1 | A3 | 11 | 5 | 2.0 | 1.0 | 0 | 0 | Zr | 30 | A | A | A | |
| 206 | #1 | A4 | 0 | 61 | 3 | 0.6 | 0.6 | 0.9 | Zr | 30 | A | A | A | |
| 207 | #1 | A5 | 0 | 61 | 3 | 0.6 | 0.6 | 0.9 | Zr | 30 | A | A | A | |
| 208 | #1 | A6 | 0 | 61 | 3 | 0.6 | 0.6 | 0.9 | Zr | 30 | A | A | A | |
| 209 | #1 | GA | 0.2 | 5 | 4.0 | 2.0 | 0 | 0 | Ti | 30 | A | A | A | |
| 210 | #1 | GI | 0.4 | 5 | 4.0 | 2.0 | 0 | 0 | Ti | 30 | A | A | A | |
| 211 | #1 | A1 | 55 | 5 | 2.0 | 1.0 | 0 | 0 | Ti | 30 | A | A | A | |

TABLE 5-continued

| | | Zn-based plating layer | | Surface treatment coating film | | | | FF treatment | | Hot pressing process Energization heating | | |
|---|---|---|---|---|---|---|---|---|---|---|---|---|
| | | | Al concen- | | | | | | Treat- ment | FF | Coating | Corro- sion |
| No | Steel type | Type | tration (mass %) | Type | Attached amount (g/m²) | Oxide A (g/m²) | Oxide B (g/m²) | Oxide C (g/m²) | Type | time (sec) | treat- ability | adhesiv- eness | resist- ance | Notes |
| 212 | #1 | A2 | 6 | 5 | 2.0 | 1.0 | 0 | 0 | Ti | 30 | A | A | A | |
| 213 | #1 | A3 | 11 | 5 | 2.0 | 1.0 | 0 | 0 | Ti | 30 | A | A | A | |
| 214 | #1 | A4 | 0 | 61 | 3 | 0.6 | 0.6 | 0.9 | Ti | 30 | A | A | A | |
| 215 | #1 | A5 | 0 | 61 | 3 | 0.6 | 0.6 | 0.9 | Ti | 30 | A | A | A | |
| 216 | #1 | A6 | 0 | 61 | 3 | 0.6 | 0.6 | 0.9 | Ti | 30 | A | A | A | |
| 217 | #1 | GA | 0.2 | 5 | 2.0 | 1.0 | 0 | 0 | Zr | 10 | B | G | A | |
| 218 | #1 | GA | 0.2 | 5 | 2.0 | 1.0 | 0 | 0 | Ti | 10 | B | G | A | |

TABLE 6

| | Ion source | Ion Concentration [ppm] | Fluorine concentration [ppm] | Free fluorine concentration [ppm] |
|---|---|---|---|---|
| Zr-based FF chemical conversion treatment liquid | $H_2ZrF_6$ | 5000 | 7000 | 300 |
| Ti-based FF chemical conversion treatment liquid | $H_2TiF_6$ | 5000 | 12000 | 300 |

Further, to verify the influence given by a P-containing compound, a V-containing compound, a Cu-containing compound an Al-containing compound, a Si-containing compound, and a Cr-containing compound present in the surface treatment layer, plated steel sheets for hot pressing were produced using the treatment liquids shown in No. 97 to No. 164 of Table 2. At this time, each of the treatment liquids shown in No. 97 to No. 164 of Table 2 was applied with a bar coater, and was dried using an oven under conditions for keeping a maximum peak temperature of 100° C. for 8 seconds. The amount of the treatment liquid attached was adjusted by the dilution of the liquid and the count of the bar coater so that the total amount of the attached nonvolatile content in the treatment liquid might be the numerical value shown in Table 7.

After the formation process of the surface treatment layer, the steel sheet of each test number was subjected to hot press heating by an energization heating system, and thus hot pressing was performed. At this time, heating was performed at 870° C., with the heating rate set to 85° C./second and 42.5° C./second.

After the hot press heating, cooling was performed until the temperature of the steel sheet became 650° C. After the cooling, the steel sheet was sandwiched by a flat sheet mold equipped with a water cooling jacket, and thus a hot pressed steel material (steel sheet) was produced. Cooling was performed up to approximately 360° C., which is the martensite transformation starting point, so as to ensure a cooling rate of 50° C./second or more even in a portion where the cooling rate had been low during the hot pressing, and thus quenching was performed.

The sheet-like hot pressed steel material of each of the test numbers described in Table 7 below was subjected to surface conditioning at room temperature for 20 seconds using a surface conditioning treatment agent, Prepalene X (product name) manufactured by Nihon Parkerizing Co., Ltd. Further, phosphate treatment was performed using a zinc phosphate treatment liquid, Palbond 3020 (product name) manufactured by Nihon Parkerizing Co., Ltd. The sheet-like hot pressed steel material was dipped in the treatment liquid for 30 seconds, with the temperature of the treatment liquid set to 43° C., and then water washing and drying were performed. After that, a phosphate treatability evaluation test was performed in a similar manner to the case shown in Table 3.

Further, the sheet-like hot pressed steel material of each of the test numbers described in Table 7 below was subjected to a coating adhesiveness evaluation test and a cycle corrosion test in a similar manner to the case shown in Table 3. The method and the evaluation criterion of each test are similar to those of the case shown in Table 3.

TABLE 7

| | | Zn-based plating layer | | Surface treatment layer | | | | | Chemical conversion treatment | Hot pressing process Energization heating | | | | |
|---|---|---|---|---|---|---|---|---|---|---|---|---|---|---|
| No | Steel type | Type | Al concen- tration (mass %) | Type | Attached amount (g/m²) | Oxide A (g/m²) | Oxide B (g/m²) | Oxide C (g/m²) | Type of chemical conversion treatment | Treat- ment time (sec) | Phos- phate treat- ability | Coating adhesiv- eness | Corro- sion resist- ance | Notes |
| 219 | #1 | GA | 0.2 | 97 | 1 | 0 | 0 | 0 | Phosphoric acid | 30 | L | F | A | Al: 0.0106 g/m² |
| 220 | #1 | GA | 0.2 | 98 | 1 | 0 | 0 | 0 | Phosphoric acid | 30 | K | E | A | Al: 0.0048 g/m² |
| 221 | #1 | GA | 0.2 | 99 | 1 | 0 | 0 | 0 | Phosphoric acid | 30 | J | D | A | Al: 0.0160 g/m² |
| 222 | #1 | GA | 0.2 | 100 | 1 | 0 | 0 | 0 | Phosphoric acid | 30 | L | F | A | Si: 0.0093 g/m² |
| 223 | #1 | GA | 0.2 | 101 | 1 | 0 | 0 | 0 | Phosphoric acid | 30 | K | E | A | Si: 0.0047 g/m² |
| 224 | #1 | GA | 0.2 | 102 | 1 | 0 | 0 | 0 | Phosphoric acid | 30 | J | D | A | Si: 0.0014 g/m² |

TABLE 7-continued

| No | Steel type | Zn-based plating layer Type | Al concentration (mass %) | Surface treatment layer Type | Attached amount (g/m²) | Oxide A (g/m²) | Oxide B (g/m²) | Oxide C (g/m²) | Chemical conversion treatment Type of chemical conversion treatment | Treatment time (sec) | Hot pressing process Energization heating Phosphate treatability | Coating adhesiveness | Corrosion resistance | Notes |
|---|---|---|---|---|---|---|---|---|---|---|---|---|---|---|
| 225 | #1 | GA | 0.2 | 103 | 1 | 0 | 0 | 0 | Phosphoric acid | 30 | J | F | A | P: 0.0107 g/m² |
| 226 | #1 | GA | 0.2 | 104 | 1 | 0 | 0 | 0 | Phosphoric acid | 30 | J | E | A | P: 0.0043 g/m² |
| 227 | #1 | GA | 0.2 | 105 | 1 | 0 | 0 | 0 | Phosphoric acid | 30 | J | D | A | P: 0.0011 g/m² |
| 228 | #1 | GA | 0.2 | 106 | 1 | 0 | 0 | 0 | Phosphoric acid | 30 | J | F | A | V: 0.0148 g/m² |
| 229 | #1 | GA | 0.2 | 107 | 1 | 0 | 0 | 0 | Phosphoric acid | 30 | J | E | A | V: 0.0074 g/m² |
| 230 | #1 | GA | 0.2 | 108 | 1 | 0 | 0 | 0 | Phosphoric acid | 30 | J | D | A | V: 0.0018 g/m² |
| 231 | #1 | GA | 0.2 | 109 | 1 | 0 | 0 | 0 | Phosphoric acid | 30 | J | F | C | Cu: 0.0319 g/m² |
| 232 | #1 | GA | 0.2 | 110 | 1 | 0 | 0 | 0 | Phosphoric acid | 30 | J | E | B | Cu: 0.0160 g/m² |
| 233 | #1 | GA | 0.2 | 111 | 1 | 0 | 0 | 0 | Phosphoric acid | 30 | J | D | A | Cu: 0.0040 g/m² |
| 234 | #1 | GA | 0.2 | 112 | 1 | 0 | 0 | 0 | Phosphoric acid | 30 | J | D | A | Cr: 0.0104 g/m² |
| 235 | #1 | GA | 0.2 | 113 | 1 | 0 | 0 | 0 | Phosphoric acid | 30 | J | D | A | Cr: 0.0042 g/m² |
| 236 | #1 | GA | 0.2 | 114 | 2 | 0 | 0 | 0 | Phosphoric acid | 30 | F | C | A | Al: 0.0053 g/m² |
| 237 | #1 | GA | 0.2 | 115 | 2 | 0 | 0 | 0 | Phosphoric acid | 30 | E | B | A | Al: 0.0021 g/m² |
| 238 | #1 | GA | 0.2 | 116 | 2 | 0 | 0 | 0 | Phosphoric acid | 30 | D | A | A | Al: 0.0005 g/m² |
| 239 | #1 | GA | 0.2 | 117 | 2 | 0 | 0 | 0 | Phosphoric acid | 30 | F | C | A | Si: 0.0047 g/m² |
| 240 | #1 | GA | 0.2 | 118 | 2 | 0 | 0 | 0 | Phosphoric acid | 30 | E | B | A | Si: 0.0023 g/m² |
| 241 | #1 | GA | 0.2 | 119 | 2 | 0 | 0 | 0 | Phosphoric acid | 30 | D | A | A | Si: 0.0005 g/m² |
| 242 | #1 | GA | 0.2 | 120 | 2 | 0 | 0 | 0 | Phosphoric acid | 30 | D | C | A | P: 0.0128 g/m² |
| 243 | #1 | GA | 0.2 | 121 | 2 | 0 | 0 | 0 | Phosphoric acid | 30 | D | B | A | P: 0.0043 g/m² |
| 244 | #1 | GA | 0.2 | 122 | 2 | 0 | 0 | 0 | Phosphoric acid | 30 | D | A | A | P: 0.0009 g/m² |
| 245 | #1 | GA | 0.2 | 123 | 2 | 0 | 0 | 0 | Phosphoric acid | 30 | D | C | A | V: 0.0074 g/m² |
| 246 | #1 | GA | 0.2 | 124 | 2 | 0 | 0 | 0 | Phosphoric acid | 30 | D | B | A | V: 0.0037 g/m² |
| 247 | #1 | GA | 0.2 | 125 | 2 | 0 | 0 | 0 | Phosphoric acid | 30 | D | A | A | V: 0.0007 g/m² |
| 248 | #1 | GA | 0.2 | 126 | 2 | 0 | 0 | 0 | Phosphoric acid | 30 | D | C | C | Cu: 0.0160 g/m² |
| 249 | #1 | GA | 0.2 | 127 | 2 | 0 | 0 | 0 | Phosphoric acid | 30 | D | B | B | Cu: 0.0080 g/m² |
| 250 | #1 | GA | 0.2 | 128 | 2 | 0 | 0 | 0 | Phosphoric acid | 30 | D | A | A | Cu: 0.0016 g/m² |
| 251 | #1 | GA | 0.2 | 129 | 2 | 0 | 0 | 0 | Phosphoric acid | 30 | D | A | A | Cr: 0.0052 g/m² |
| 252 | #1 | GA | 0.2 | 130 | 2 | 0 | 0 | 0 | Phosphoric acid | 30 | D | A | A | Cr: 0.0021 g/m² |
| 253 | #1 | GA | 0.2 | 131 | 2 | 0 | 0 | 0 | Phosphoric acid | 30 | F | F | A | Al: 0.0085 g/m² |
| 254 | #1 | GA | 0.2 | 132 | 2 | 0 | 0 | 0 | Phosphoric acid | 30 | E | E | A | Al: 0.0042 g/m² |
| 255 | #1 | GA | 0.2 | 133 | 2 | 0 | 0 | 0 | Phosphoric acid | 30 | D | D | A | Al: 0.0011 g/m² |
| 256 | #1 | GA | 0.2 | 134 | 2 | 0 | 0 | 0 | Phosphoric acid | 30 | F | F | A | Si: 0.0075 g/m² |
| 257 | #1 | GA | 0.2 | 135 | 2 | 0 | 0 | 0 | Phosphoric acid | 30 | E | E | A | Si: 0.0037 g/m² |
| 258 | #1 | GA | 0.2 | 136 | 2 | 0 | 0 | 0 | Phosphoric acid | 30 | D | D | A | Si: 0.0009 g/m² |
| 259 | #1 | GA | 0.2 | 137 | 2 | 0 | 0 | 0 | Phosphoric acid | 30 | D | F | A | P: 0.0128 g/m² |
| 260 | #1 | GA | 0.2 | 138 | 2 | 0 | 0 | 0 | Phosphoric acid | 30 | D | E | A | P: 0.0043 g/m² |
| 261 | #1 | GA | 0.2 | 139 | 2 | 0 | 0 | 0 | Phosphoric acid | 30 | D | D | A | P: 0.0017 g/m² |
| 262 | #1 | GA | 0.2 | 140 | 2 | 0 | 0 | 0 | Phosphoric acid | 30 | D | F | A | V: 0.0148 g/m² |
| 263 | #1 | GA | 0.2 | 141 | 2 | 0 | 0 | 0 | Phosphoric acid | 30 | D | E | A | V: 0.0074 g/m² |
| 264 | #1 | GA | 0.2 | 142 | 2 | 0 | 0 | 0 | Phosphoric acid | 30 | D | D | A | V: 0.0022 g/m² |
| 265 | #1 | GA | 0.2 | 143 | 2 | 0 | 0 | 0 | Phosphoric acid | 30 | D | F | C | Cu: 0.0319 g/m² |
| 266 | #1 | GA | 0.2 | 144 | 2 | 0 | 0 | 0 | Phosphoric acid | 30 | D | E | B | Cu: 0.0160 g/m² |
| 267 | #1 | GA | 0.2 | 145 | 2 | 0 | 0 | 0 | Phosphoric acid | 30 | D | D | A | Cu: 0.0032 g/m² |
| 268 | #1 | GA | 0.2 | 146 | 2 | 0 | 0 | 0 | Phosphoric acid | 30 | D | D | A | Cr: 0.0156 g/m² |
| 269 | #1 | GA | 0.2 | 147 | 2 | 0 | 0 | 0 | Phosphoric acid | 30 | D | D | A | Cr: 0.0052 g/m² |
| 270 | #1 | GA | 0.2 | 148 | 3 | 0 | 0 | 0 | Phosphoric acid | 30 | C | C | A | Al: 0.0111 g/m² |
| 271 | #1 | GA | 0.2 | 149 | 3 | 0 | 0 | 0 | Phosphoric acid | 30 | B | B | A | Al: 0.0048 g/m² |
| 272 | #1 | GA | 0.2 | 150 | 3 | 0 | 0 | 0 | Phosphoric acid | 30 | A | A | A | Al: 0.0016 g/m² |
| 273 | #1 | GA | 0.2 | 151 | 3 | 0 | 0 | 0 | Phosphoric acid | 30 | C | C | A | Si: 0.0084 g/m² |
| 274 | #1 | GA | 0.2 | 152 | 3 | 0 | 0 | 0 | Phosphoric acid | 30 | B | B | A | Si: 0.0042 g/m² |
| 275 | #1 | GA | 0.2 | 153 | 3 | 0 | 0 | 0 | Phosphoric acid | 30 | A | A | A | Si : 0.0014 g/m² |
| 276 | #1 | GA | 0.2 | 154 | 3 | 0 | 0 | 0 | Phosphoric acid | 30 | A | C | A | P: 0.0128 g/m² |
| 277 | #1 | GA | 0.2 | 155 | 3 | 0 | 0 | 0 | Phosphoric acid | 30 | A | B | A | P: 0.0038 g/m² |
| 278 | #1 | GA | 0.2 | 156 | 3 | 0 | 0 | 0 | Phosphoric acid | 30 | A | A | A | P: 0.0013 g/m² |
| 279 | #1 | GA | 0.2 | 157 | 3 | 0 | 0 | 0 | Phosphoric acid | 30 | A | C | A | V: 0.0133 g/m² |
| 280 | #1 | GA | 0.2 | 158 | 3 | 0 | 0 | 0 | Phosphoric acid | 30 | A | B | A | V: 0.0067 g/m² |
| 281 | #1 | GA | 0.2 | 159 | 3 | 0 | 0 | 0 | Phosphoric acid | 30 | A | A | A | V: 0.0220 g/m² |
| 282 | #1 | GA | 0.2 | 160 | 3 | 0 | 0 | 0 | Phosphoric acid | 30 | A | C | C | Cu: 0.0288 g/m² |
| 283 | #1 | GA | 0.2 | 161 | 3 | 0 | 0 | 0 | Phosphoric acid | 30 | A | B | B | Cu: 0.0144 g/m² |
| 284 | #1 | GA | 0.2 | 162 | 3 | 0 | 0 | 0 | Phosphoric acid | 30 | A | A | A | Cu: 0.0048 g/m² |
| 285 | #1 | GA | 0.2 | 163 | 3 | 0 | 0 | 0 | Phosphoric acid | 30 | A | A | A | Cr: 0.0156 g/m² |
| 286 | #1 | GA | 0.2 | 164 | 3 | 0 | 0 | 0 | Phosphoric acid | 30 | A | A | A | Cr: 0.0078 g/m² |

As is clear from Tables 3 to 5 and Table 7 above, it is shown that the zinc-based plated steel sheet according to the present invention has excellent coating film adhesiveness after hot pressing even in the case where the chemical conversion treatment to be performed thereafter is not sufficient.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

The invention claimed is:

1. A zinc-based plated steel sheet comprising:
   a zinc-based plated steel sheet that is a base metal; and
   a surface treatment layer formed on at least one surface of the zinc-based plated steel sheet, wherein
   the surface treatment layer contains one or more oxides selected from titanium oxide, and nickel oxide each having a particle size of more than or equal to 2 nm and less than or equal to 100 nm, in a range of more than or equal to 0.2 g/m$^2$ and less than or equal to 2 g/m$^2$ per one surface, and
   the surface treatment layer further contains one or more vanadium-containing compounds and/or one or more copper-containing compounds in the following range as a content per one surface, and contains resin,
   the one or more vanadium-containing compounds: more than or equal to 0.0007 g/m$^2$ and less than or equal to 0.01 g/m$^2$ on a V basis,
   the one or more copper-containing compounds: more than or equal to 0.0016 g/m$^2$ and less than or equal to 0.02 g/m$^2$ on a Cu basis.

2. The zinc-based plated steel sheet according to claim 1, wherein
   the surface treatment layer further contains one or more phosphorus-containing compounds, one or more aluminum-containing compounds, one or more silicon-containing compounds, and/or one or more chromium-containing compounds in the following range as a content per one surface,
   the one or more phosphorus-containing compounds: more than or equal to 0.0 g/m$^2$ and less than or equal to 0.01 g/m$^2$ on a P basis,
   the one or more aluminum-containing compounds: more than or equal to 0.0 g/m$^2$ and less than or equal to 0.005 g/m$^2$ on an Al basis,
   the one or more silicon-containing compounds: more than or equal to 0.0 g/m$^2$ and less than or equal to 0.005 g/m$^2$ on a Si basis, and
   the one or more chromium-containing compounds: more than or equal to 0.0 g/m$^2$ and less than or equal to 0.01 g/m$^2$ on a Cr basis.

3. The zinc-based plated steel sheet according to claim 1, wherein
   the particle size of each of the one or more oxides selected from titanium oxide, and nickel oxide is more than or equal to 5 nm and less than or equal to 50 nm.

4. The zinc-based plated steel sheet according to claim 1, wherein
   the content of the one or more oxides selected from titanium oxide, and nickel oxide is more than or equal to 0.4 g/m$^2$ and less than or equal to 1.5 g/m$^2$ per one surface.

5. The zinc-based plated steel sheet according to claim 1, wherein
   the one or more oxides are titanium oxide.

6. The zinc-based plated steel sheet according to claim 1, wherein
   the zinc-based plated steel sheet is a zinc-based plated steel sheet for hot pressing.

\* \* \* \* \*